(12) United States Patent
Zimmermann

(10) Patent No.: US 12,134,445 B2
(45) Date of Patent: Nov. 5, 2024

(54) ENERGY CONVERSION SYSTEM

(71) Applicant: Robert Zimmermann, Eberhardzell (DE)

(72) Inventor: Robert Zimmermann, Eberhardzell (DE)

(73) Assignee: Robert Zimmermann, Eberhardzell (DE)

( * ) Notice: Subject to any disclaimer, the term of this patent is extended or adjusted under 35 U.S.C. 154(b) by 405 days.

(21) Appl. No.: 17/513,630

(22) Filed: Oct. 28, 2021

(65) Prior Publication Data

US 2022/0048600 A1 Feb. 17, 2022
US 2023/0060120 A9 Feb. 23, 2023

Related U.S. Application Data

(63) Continuation of application No. PCT/EP2020/062750, filed on May 7, 2020.

(30) Foreign Application Priority Data

May 7, 2019 (DE) .......................... 102019111886.7

(51) Int. Cl.
 *B63B 35/44* (2006.01)
 *H02S 10/40* (2014.01)
 *H02S 30/20* (2014.01)
(52) U.S. Cl.
 CPC .............. *B63B 35/44* (2013.01); *H02S 10/40* (2014.12); *H02S 30/20* (2014.12); *B63B 2035/4453* (2013.01); *B63B 2209/18* (2013.01); *B63B 2221/22* (2013.01)

(58) Field of Classification Search
 CPC ............ B63B 35/44; B63B 2035/4453; B63B 2209/18
 See application file for complete search history.

(56) References Cited

U.S. PATENT DOCUMENTS 5,144,904 A 9/1992 Weldon
2018/0119994 A1 5/2018 Helming et al.

FOREIGN PATENT DOCUMENTS

| CN | 107585268 A | 1/2018 | |
|---|---|---|---|
| DE | 102009031256 B4 | 2/2012 | |
| DE | 102018119842 A1 | 2/2020 | |
| DE | 102019111886 A1 * | 11/2020 | ............. B63B 35/44 |
| DE | 102019111888 A1 * | 11/2020 | ............... B63B 1/12 |

(Continued)

OTHER PUBLICATIONS

International Preliminary Report and Written Opinion on the Patentability of Application No. PCT/EP2020/062750, Mailed Nov. 2, 2021, 7 pages.

(Continued)

*Primary Examiner* — S. Joseph Morano
*Assistant Examiner* — Jovon E Hayes
(74) *Attorney, Agent, or Firm* — Womble Bond Dickinson (US) LLP

(57) ABSTRACT

According to the invention an energy conversion system, in particular a solar park, is proposed, which is configured to be arranged floating on a body of water, with at least three floating units (48a, 48b) and with at least one connection device (66), wherein the connection device (66) connects at least two floating units (48) in a rigid manner and/or at least two floating units (48a, 48b) in a movable manner.

19 Claims, 14 Drawing Sheets

(56) References Cited

FOREIGN PATENT DOCUMENTS

Figure 1A:
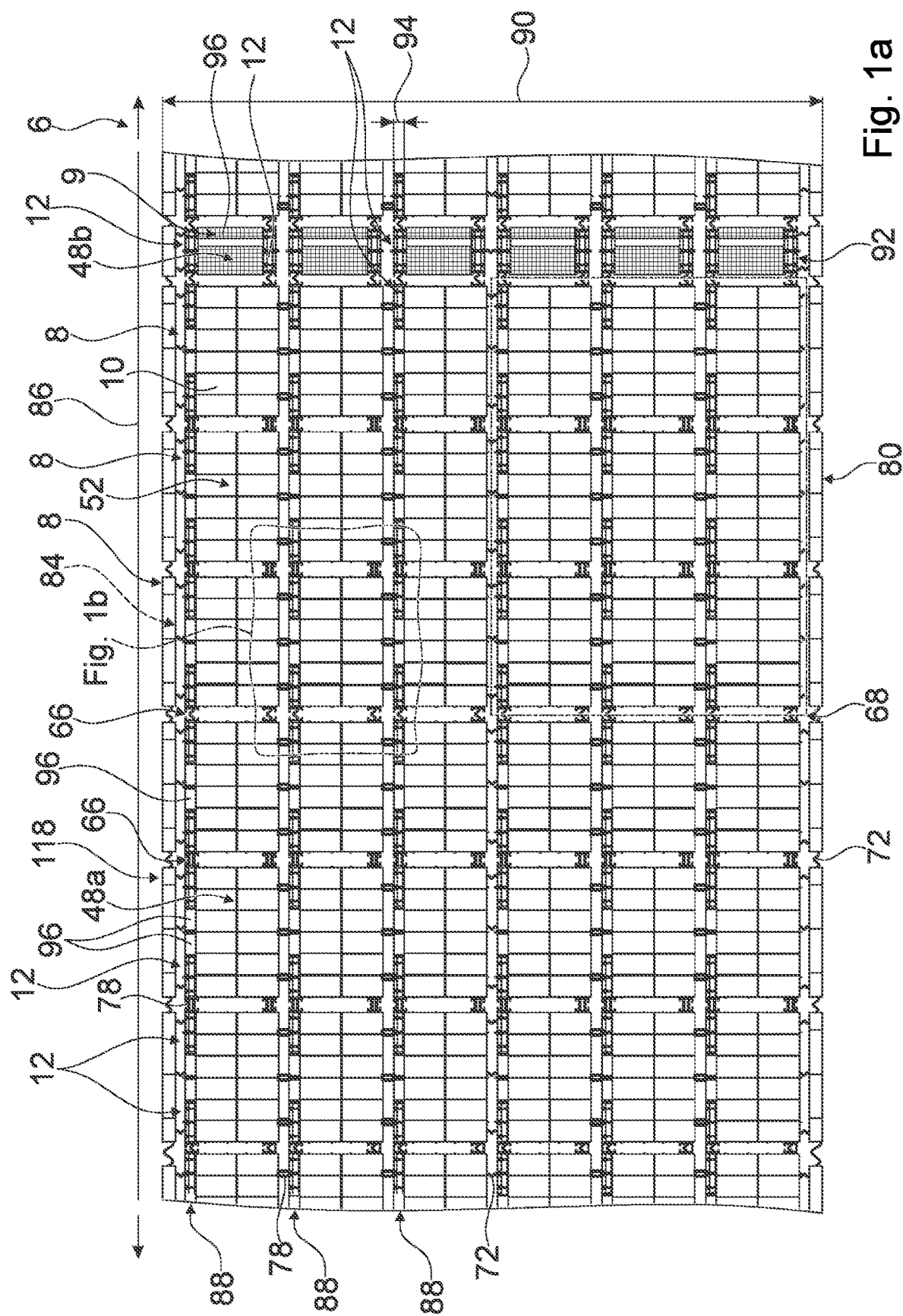

| EP | 2270404 A2 * | 1/2011 | ............... B63B 3/08 |
| FR | 2968386 A1 | 6/2012 | |
| KR | 101339358 B1 * | 12/2013 | ............. B63B 35/38 |
| KR | 101450846 B1 | 10/2014 | |
| KR | 1020160119671 A | 10/2016 | |
| KR | 101718001 B1 | 3/2017 | |
| KR | 101946213 B1 | 2/2019 | |
| WO | WO-2012166966 A1 * | 12/2012 | ............. F24J 2/5239 |
| WO | WO-2016143954 A1 * | 9/2016 | ............. B63B 35/44 |
| WO | WO-2017146458 A1 * | 8/2017 | ............. B63B 35/38 |
| WO | WO-2020224993 A1 * | 11/2020 | ............. B63B 35/44 |

OTHER PUBLICATIONS

German Office Action and Search Report on the Patentability of Application No. 102019111886.7, Mailed Feb. 8, 2021, 8 pages.
Korean Office Action received in related Korean Application No. 10-2021-21581, mailed Jan. 20, 2024, 18 pages.
Israeli Office Action received in related Israeli Application No. 287427 A, mailed Mar. 25, 2024, 5 pages.
Office Action received in related Chinese Application No. 202080048188.0, mailed Mar. 29, 2024, 13 pages.
First Examination Report for Australian Patent Application No. 2020269416, mailed Jul. 31, 2023, 4 pages.
Office Action for European Patent Application No. 20727161.0, mailed Nov. 7, 2023, 5 pages.

* cited by examiner

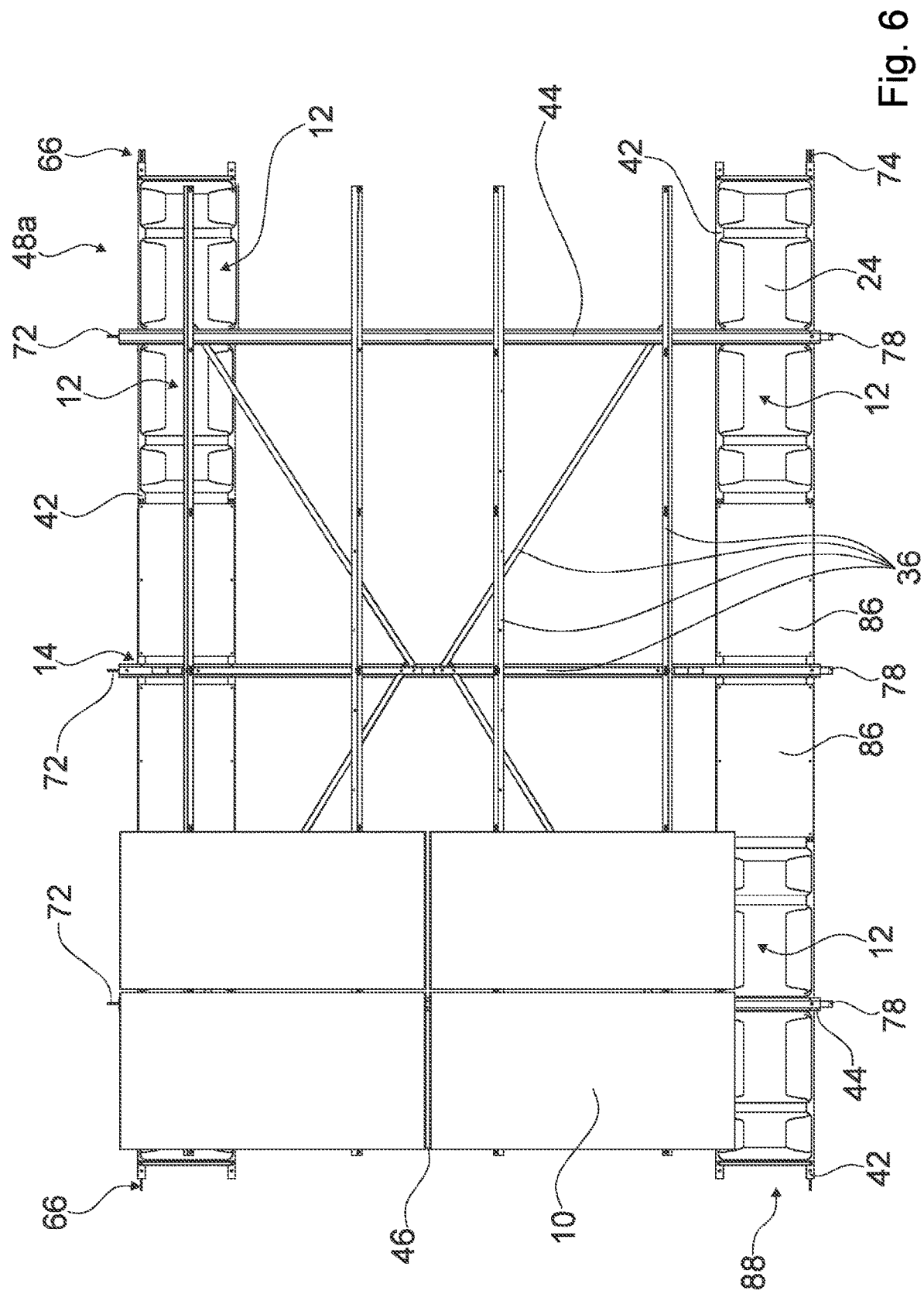

ENERGY CONVERSION SYSTEM

ADVANTAGES OF THE INVENTION

An energy conversion system, in particular a solar park, is proposed, which is configured to be arranged floating on a body of water. The energy conversion system comprises at least three floating units and at least one connection device, the connection device connecting at least two floating units in a rigid manner and/or at least two floating units in a movable manner.

By a "floating unit" is herein a floatable unit to be understood that is configured to accommodate an energy conversion unit and/or a power converter device. The floating unit is preferably configured for an arrangement of the energy conversion unit and/or of the power converter device above a water surface.

In particular rigidly connected floating units have a significantly smaller mobility relative to each other than floating units which are movably connected. Furthermore, in comparison to movably connected floating units, rigidly connected floating units in particular have a mobility that is reduced advantageously by at least 35%, preferentially by at least 55%, preferably by at least 75%, particularly preferably by at least 85% and especially advantageously by at least 95%. Movably connected floating units preferably have a mobility relative to each other that is higher than that of rigidly connected floating units.

A rigid connection unit is preferentially configured to avoid a movement of the floating units, in particular within a raft unit, relative to one another, at least to a large extent; in particular to reduce a movement of the floating units, in particular within a raft unit, relative to one another to an elastic deformation of a component, at least to a large extent. Preferably the connection device comprises at least one rigid connection unit. Furthermore, a rigid connection is preferentially intended in particular to be free of a mobile guiding element, like in particular free of a mobile articulation or of a rail guidance. In particular the rigid connection unit may have a mobility that is due to tolerances of a structural component. Preferably the rigid connection unit may have an elastic and/or plastic deformability depending on a material. A rigid connection preferably has, preferentially at a temperature of 20° C., an elasticity module that is in particular greater than 15 GPa, preferentially greater than 40 GPa, preferably greater than 65 GPa and particularly preferably greater than 150 GPa. Moreover a rigid connection may in particular have movements due to tolerances of a structural component.

Furthermore the connection device comprises at least one mobile connection unit. The mobile connection unit is preferably configured to permit a relative movement of the floating units, in particular of the raft units, to one another. Preferentially the mobile connection unit comprises an elastic element. The elastic element preferably has, preferentially at a temperature of 20° C., an elasticity module that is in particular smaller than 18 GPa, preferentially smaller than 6 GPa, preferably smaller than 2 GPa and particularly preferably smaller than 0.5 GPa. The mobile connection unit further comprises at least one support unit for a mobile support of at least two connection elements. Preferably at least a large portion of the mobile connection unit has, preferably at a temperature of 20° C., an elasticity module that is in particular greater than 15 GPa, preferentially greater than 40 GPa, preferably greater than 65 GPa and particularly preferably greater than 150 GPa. In particular the mobile connection unit comprises at least one movable articulation and/or a mobile guiding unit, like for example a translational support unit. Especially preferentially the mobile connection unit has an increased mobility, which is in particular increased relative to a mobility due to component tolerances and/or tolerance(s) due to material(s). The term "at least a large portion" and/or grammar-induced modifications thereof are/is in particular to mean at least 50%, advantageously at least 65%, preferentially at least 75%, particularly preferably at least 85% and especially advantageously at least 95%.

An implementation according to the invention allows providing an energy conversion system that is realizable in a particularly flexible manner. Moreover the implementation according to the invention features an easy mountability with favorable production costs and a compact construction.

It is also proposed that at least one of the floating units comprises at least two, in particular at least three, floating bodies, as a result of which a high degree of stability is achievable in an advantageously simple manner. Furthermore, especially advantageously an easy static analysis is achievable. By a "floating body" is herein in particular a body to be understood which generates a buoyancy force. In particular a floating body is to be understood as a hollow body with one or several hollow spaces, preferably with one single contiguous hollow space. Preferentially at least four floating bodies have a rectangular layout. A parallel and/or honeycomb-like and/or circle-shaped and/or elliptic and/or polygonal layout and/or a combination of the layouts of a sufficient number of floating bodies would also be conceivable.

Beyond this it is proposed that the floating unit comprises at least one carrier structure which is configured to transfer a support force of at least one power converter device to the at least one floating body. By a "power converter device" is in particular an electrical appliance to be understood that is configured to transform a fed-in type of electrical current. The power converter device is preferably realized as a rectifier and/or as a frequency converter. Particularly preferably the power converter device is realized as a power inverter. It is further conceivable that the power converter device is configured to change a voltage and/or a frequency, in particular of a fed-in electrical power.

The carrier structure is preferentially configured to divert support forces, in particular to the floating body. Preferably the carrier structure is embodied of metal, at least to a large extent. Especially preferentially the carrier structure is embodied of steel, at least to a large extent.

It is further proposed that the floating unit comprises at least one carrier structure which is configured to transfer a support force of at least one energy conversion unit to the at least one floating body. Preferentially the energy conversion unit is embodied as a solar element. The solar element is preferably configured for a conversion of a solar radiation energy. It is in particular conceivable that the solar element is implemented as a conversion unit for a conversion of a solar radiation energy into a thermal energy, in particular for the purpose of heating a heat carrier medium. Especially preferentially the solar element is implemented as a photovoltaic cell and/or as a photovoltaic module, which is configured to convert a solar radiation energy into an electrical energy. Moreover it is conceivable that the energy conversion unit is embodied as a wind turbine and/or as a wave generator unit and/or as an electrolyzer and/or as a fuel cell.

Beyond this it is proposed that the floating body comprises a receiving region for the carrier structure on at least one side wall and/or on an upper side, which especially advantageously allows an introduction of the support forces. Preferentially an outer wall is embodied as a side wall and/or upper side of the floating body.

Preferably a side wall is a wall of the floating body whose envelope section faces toward a reference side wall of a smallest imaginary reference rectangular cuboid, said reference rectangular cuboid just still enclosing the floating body. Preferentially an envelope is a geometry, in particular a geometrically smallest geometry, which envelops a body, which is preferentially a free geometry, and which is in particular free of inflection points.

Preferentially the, in particular imaginary smallest, reference rectangular cuboid has, preferably in a mounted state of the floating body, a reference upper side and a reference underside. The reference upper side and the reference underside are in particular arranged at least substantially parallel to a, preferably ideal, water surface. By "substantially parallel" is here in particular an orientation of a direction relative to a reference direction to be understood, in particular in a plane, the direction having a deviation from the reference direction that is in particular smaller than 8°, advantageously smaller than 5° and especially advantageously smaller than 2°. The reference rectangular cuboid comprises reference side faces. In particular the reference side faces are, preferably in a mounted operation state, arranged perpendicularly to the ideal water surface. "Facing towards" is in particular to mean, in this context, that a surface faces towards a reference surface insofar as a surface normal of the surface, in particular of the envelope section of the floating body, has a parallel component relative to a reference surface normal of the reference surface, in particular of the reference surface of a reference rectangular cuboid, having a value of more than/equal to 50% of the value of the surface normal.

The side wall is in particular configured to connect an upper side and an underside of the floating body to one another. Preferably an ideal water surface extends in a horizontal plane and is in particular free of waves and currents and of other perturbations. Preferably the curvature of the Earth is neglected, in particular to illustrate the ideal water surface.

Preferably an upper side of the floating body is a wall of the floating body whose envelope section faces towards the reference upper side of the imaginary, in particular smallest, reference rectangular cuboid enclosing the float, which preferentially just still encloses the floating body completely. Furthermore, an underside is a wall of the floating body whose envelope section faces towards the reference underside of the imaginary, in particular smallest, reference rectangular cuboid enclosing the floating body. Preferably the upper side is arranged above the water surface, in particular in a space above the water surface. Especially preferentially the upper side of the floating body has in an assembled operation state a distance from the, in particular ideal, water surface.

By a "receiving region" is in particular, in this context, a region to be understood that forms a support surface for a support of support forces. In particular, the receiving region comprises a receiving contour. Preferably the support surface is implemented by the receiving contour. The receiving contour is preferably configured for a delimitation of the receiving region. A receiving region being arranged on at least one side wall of the floating body is in particular to mean that a receiving region, which is preferably realized as an elevation and/or as a deepening, is arranged in a region of the side wall. Especially preferentially the receiving region is realized as a deepening in a region of the side wall.

It would also be conceivable that the receiving contour, in particular the receiving region, may preferably be embodied in an L-shape and/or U-shape and/or T-shape and/or C-shape and/or Omega-shape and/or V-shape and/or O-shape, and/or as a combination of shapes or as a multifold combination.

Furthermore the receiving region is in particular embodied integrally with the floating body, as a result of which a particularly advantageous reduction of production costs and/or assembly costs is achievable.

"Integrally" is in particular to mean at least by substance-to-substance bond, for example by a welding process, a gluing process, an injection-molding process and/or by another process that is deemed expedient by someone skilled in the art, and/or advantageously formed in one piece, like for example by a production from one cast and/or by a blow procedure, in particular an extrusion blow procedure, and/or by a production in a one-component or multi-component injection molding process, and/or especially advantageously from a single blank. In particular the receiving region is molded integrally to the floating body. Preferentially the receiving region is implemented to be molded integrally with the floating body by the extrusion blow procedure.

It is also proposed that the receiving region is configured for a form-fit accommodation of the carrier structure, as a result of which an advantageously time-efficient and/or non-destructive assembly is achievable with low material cost. "Form-fit" is in particular to mean that surfaces which are situated opposite one another in an assembled operation state exert a holding force upon one another that acts in a normal direction of the surfaces. In particular, the structural components are in a geometrical engagement with each other. The surfaces are in particular configured to preferably transfer support forces from the form-fit receiving region to the carrier structure. Preferentially the surfaces may in an assembled operation state have a distance from each other.

The floating body is preferably implemented of a thermoplastic material. In particular, the floating body is, at least to a large extent, implemented of a food-safe material. Particularly preferably the floating body is implemented of an HDPE plastic material. Furthermore the material of the floating body is in particular implemented with an additive coloring and/or with a preferably additive UV protection. The extrusion blow procedure is in particular configured to form the floating body from a flexible-tube-type preform. Furthermore, a volume-variable application tool is preferably applied in the extrusion blow procedure. The application tool in particular has a modular structure. Preferentially the application tool is implemented as a negative tool, in particular of the floating body. In particular, the negative tool has on its inner side structural features of an end product, in particular an intended shape of the floating body. Particularly preferably the floating body has a volume that is in particular greater than 350 liters, preferably greater than 450 liters, preferentially greater than 700 liters and particularly preferably greater than 900 liters. In particular the floating body has a volume that is in particular smaller than 1700 liters, preferentially smaller than 1500 liters, preferably smaller than 1300 liters and especially preferentially smaller than 1100 liters.

Furthermore a raft unit is proposed, comprising at least two, in particular at least three, floating units, wherein in an assembled operation state the connection device rigidly connects at least two of the floating units of the raft unit to each other, and in particular rigidly connects at least a large portion of the floating units to each other, as a result of which it is possible to provide an advantageously flexible applicability of the invention in regard to external environment impact, e.g. wind and/or waves. "Rigidly . . . at least a large portion" is in particular to mean, in this context, at least 50%, advantageously at least 65%, preferably at least 75%, particularly preferably at least 85% and especially advantageously at least 95% of the floating units being rigidly connected to form a raft unit. Preferentially at least three floating units are rigidly connected to one another to form a raft unit. Preferably at least four, and less than ten, floating units are rigidly connected to each other to form a raft unit. The floating units are preferably rigidly connected in a rectangular array, in particular to form a raft unit. In particular less than twelve floating units are rigidly connected to each other to form a raft unit. Preferably at least four, and less than ten, floating units are rigidly connected to each other to form a raft unit. Preferably the floating units are rigidly connected to each other in a rectangular array, in particular to form a raft unit. Preferentially the floating units are rigidly connected to each other in a circular and/or elliptic array to form a raft unit. It is also conceivable that the floating units are rigidly connected to each other in a polygonal array to form a raft unit. It is moreover preferably possible that floating units of the raft unit are rigidly connected to each other in a first direction, and are movably connected to each other in a second direction, which is in particular realized perpendicularly to the first direction.

It is further possible that the floating units are rigidly connected to form a raft unit in an array that is optimized in terms of flow resistance, in particular drop-shaped and/or sphere-shaped and/or preferably a projection thereof. The connection device is preferentially arranged on a carrier structure of the floating unit. Preferably a partial region of the carrier structure of the floating unit is implemented as a connection region for receiving the connection device.

Furthermore it is proposed that the raft unit is embodied as an M×N array, with M*N floating units which are, at least to a large extent, rigidly connected, M and N each being an element from the set of positive integers, thus allowing to provide a flexibly implementable adaption of a stability in regard to environment influences having different impact, in particular depending on different locations or sites. Preferably the number zero is excluded from the set of positive integers. Preferably the smallest number in the set of positive integers is the number one. Particularly preferably the smallest number in the set of positive integers is the number two. The raft unit is in particular implemented in a square shape. In a square-shaped array preferably M is equal to N. Preferably N is equal to M.

Beyond this it is proposed that at least two raft units are, at least to a large extent, connected to one another in a movable manner by means of the connection device. This allows providing an advantageously flexible applicability of the invention in regard to external environment impact, e.g. wind and/or waves. "At least to a large extent . . . in a movable manner" is in particular to mean, in this context, that at least 50%, advantageously at least 65%, preferably at least 75%, particularly preferably at least 85% and especially advantageously at least 95% of the raft units are connected to one another in a movable manner, in particular in an assembled operation state. Preferably the connection device is connected with the carrier structure, in particular with at least one of the floating units of the raft unit. Preferentially the connection device is embodied as a spacer. In particular, the connection device is configured to realize a minimum distance between two connected floating units. The connection device is preferably configured to space apart at least two floating units, in particular to space them apart from each other. Preferably the minimum distance provided by the connection device between two connected floating units is implemented to be in particular greater than 5 cm, preferably greater than 10 cm, preferentially greater than 15 cm and particularly preferably greater than 20 cm.

It is also proposed that the connection device at least partially has a connection with the carrier structure. In this way an advantageously flexible implementability of the invention is achievable due to an efficient force transfer. Moreover, it is especially advantageously possible for huge forces to be transferred from and/or onto the carrier structures directly, and thus for a force flow to be advantageously transferred away.

The carrier structure preferably comprises at least one carrier element that is realized by a hollow profile, as a result of which it is in particular possible to provide an advantageously lightweight and stable carrier structure. The hollow profile is preferably embodied as a tube-shaped rod profile. Preferentially the hollow profile is embodied as a semifinished product. Especially preferentially the hollow profile has a rectangular cross section. A polygonal and/or circle-shaped and/or square and/or elliptic and/or undulate cross section and/or a combination thereof are/is also conceivable.

In an assembled operation state the carrier element further comprises, at a deepest point, at least one opening, a water drainage being advantageously available in this way. In particular the carrier element comprises, at a deepest point, preferably in an assembled operation state, an opening towards the, preferably ideal, water surface and/or parallel to a reference surface normal of the reference underside of the floating body. It is further conceivable that in an assembled operation state the carrier element comprises, in particular at a deepest point, an opening in a horizontal direction. In particular, in an assembled operation state the carrier element preferably comprises an opening that is oriented at least substantially downwards, in particular in a direction parallel to a reference surface normal of the reference underside of the floating body. This advantageously allows preventing a waterlogging, in particular an accompanying possible corrosive impact on the carrier element.

In an assembled state the carrier element is preferably arranged above the water surface. Preferentially the opening of the carrier element is oriented towards the water surface. Especially preferentially the opening is oriented in the direction of the earth acceleration, in particular to permit water exit from the carrier element. The opening is preferably arranged at a deepest point of the carrier element, in particular towards a, preferably ideal, water surface. It is also conceivable that the opening is oriented at least substantially parallel to the water surface.

The carrier element is furthermore realized as a C profile, as a result of which it is in particular possible to provide an advantageously high-grade production efficiency at low production cost. The C profile is preferentially embodied as a profiled semifinished product. Preferably the C profile is embodied as a rectangular profile. Particularly preferably the C profile is enclosed at least on two sides and, in particular at least partially, comprises an opening on at least one side.

The carrier structure further comprises at least two carrier elements which are embodied as longitudinal carrier elements and at least one carrier element which is embodied as a transverse carrier element, for a form-fit accommodation of the at least one floating body, thus in particular allowing flexible integration of the floating body in the installation according to the invention. Moreover a reduction of assembly time is particularly advantageously possible. Especially advantageously this allows doing without making use of fixation means entering the floating body. Preferably, in an assembled state, the at least one carrier element that is embodied as a longitudinal carrier element is arranged along a longitudinal side of the floating body. In particular, the at least one carrier element that is embodied as a longitudinal carrier element is arranged in at least one receiving region of the side walls. Preferably the at least one carrier element that is embodied as a transverse carrier element is arranged on an upper side of the floating body. In particular the at least one carrier element that is embodied as a transverse carrier element is arranged in the receiving region of the upper side of the floating body. The at least one carrier element embodied as a longitudinal carrier element and the at least one carrier element embodied as a transverse carrier element are preferably arranged in such a way that, in an assembled operation state, in particular on the ideal water surface, a holding force can be exerted in a horizontal and/or in a vertical direction counter to a relative movement of the floating body and of the carrier structure. The at least one carrier element that is embodied as a longitudinal carrier element is in particular configured to exert a holding force counter to a vertical movement of the floating body relative to the carrier structure.

The carrier structure preferably comprises a connection region for an accommodation of the connection device. Preferentially the connection region is arranged in a front region of the carrier elements of the carrier structure. Preferably a carrier element, implemented as a hollow profile, comprises a front region as a connection region. Particularly preferably the front faces of the carrier elements embodied as longitudinal carrier elements and as transverse carrier elements are implemented as connection regions. The connection region in particular comprises a fixation means receiving region for receiving fixation means. The fixation means receiving region is preferably configured for receiving a rod-shaped fixation means. In particular, the fixation means receiving region is realized as an opening. Preferably the opening is realized to be round or angular. It is conceivable that the connection region may in particular be implemented as a latch region for receiving a latching means. For establishing a latch connection, a latching means in particular comprises a spring-elastic component, which is configured to be elastically deflected in assembly.

It is also proposed that, in a pre-assembled state, the connection device comprises at least one connection unit that is implemented to be foldable. In this way an especially advantageous reduction of assembly costs as well as increased assembly efficiency are achievable. Moreover, it is herewith particularly advantageously possible to achieve a high flexibility of the invention. In particular, the connection device is configured to be in a pre-assembled state pivotable and/or rotatable and/or displaceable and/or foldable. Preferably, in a pre-assembled state the connection device is partially connected with at least one of the floating units, in particular with one of the carrier structures of the floating units. Especially preferentially, in a pre-assembled state the connection device is loosely connected with the floating unit. Preferably, in a pre-assembled state the connection device is partially connected with the carrier structure of at least one of the floating units. In particular, in a pre-assembled state the connection device is connected with a connection region of the floating unit, preferably in a loose and/or incomplete manner.

In particular, in the pre-assembled state the connection device is configured to be connected to the carrier element that is embodied as a longitudinal carrier element or to the carrier element that is embodied as a transverse carrier element by means of at least one connection element, in particular a screw connection. Preferably the carrier element embodied as a longitudinal carrier element or the carrier element embodied as a transverse carrier element comprises a receiving opening in a front region for the purpose of receiving the connection device. The receiving opening is preferentially realized as a recess. The receiving opening is in particular implemented along a longitudinal axis of the carrier element that is embodied as a longitudinal carrier element or of the carrier element that is embodied as a transverse carrier element. The receiving opening is preferably configured to receive a longitudinal axis of the connection device in a perpendicular position, in particular at least substantially perpendicularly to the ideal water surface. The term "substantially perpendicularly" is here in particular intended to define an orientation of a direction relative to a reference direction, wherein the direction and the reference direction, in particular viewed in a plane, include an angle of 90 degrees, the angle having a maximum deviation that is in particular smaller than 15 degrees, advantageously smaller than 5 degrees and especially advantageously smaller than 2 degrees. Preferably the connection device is realized in such a way that it is foldable around a connection axis in a pre-assembled state. The foldable connection device is in particular configured to be folded from a pre-assembled state into an assembled operation state. Furthermore, in particular a longitudinal axis of the foldable connection device is folded from a position extending perpendicularly to the ideal water surface into a position of an assembled operation state. The, in particular movable, connection device is preferably realized in such a way that it is foldable by an angle that is in particular greater than 45 degrees, preferably greater than 60 degrees, preferentially greater than 90 degrees and particularly preferably greater than 120 degrees.

The connection device is moreover configured, in particular in a pre-assembled state, to be movably transferred into a position suitable for assembly. Preferably, in a pre-assembled state, the connection device is configured to be folded into a position suitable for assembly. In particular, at least one carrier element of the carrier structure comprises the receiving opening. Furthermore the connection device is preferably, in particular in a pre-assembled state, at least partially arranged in the receiving opening of the carrier element. Preferentially the connection device is in an assembled state arranged outside the receiving opening of the carrier element, preferably at least to a large extent.

It is further proposed that the connection device comprises at least one damper unit. In an assembled operation state the damper unit is preferably arranged between the connection device and a receiving region of one of the carrier elements embodied as longitudinal carrier elements or as transverse carrier elements. Preferentially the damper unit is embodied as a springy and/or elastic element and/or comprises at least one springy and/or elastic damper element. The damper unit, in particular the damper element is in particular configured for an extraction of energy from a wave-like and/or oscillation-like process. The damper unit, in particular the damper element, is preferably implemented as a macroscopic element. The damper unit, in particular the damper element, in particular has at least one extension that is in a normal operation state elastically modifiable by at least 10%, in particular by at least 20%, preferably by at least 30% and especially advantageously by at least 50%. Particularly preferably the damper unit, in particular the damper element, is configured to generate a counter force acting counter to the modification, said counter force being in particular dependent on a modification of the extension, in particular proportional to the modification. In particular, the extension of the damper element is realized as a maximum distance between two points of a perpendicular projection of the damper element onto a plane. By a "macroscopic element" is in particular an element to be understood having an extension of at least 1 mm, in particular at least 5 mm and preferentially at least 10 mm. The damper element is preferably embodied as a synthetic damper element and/or as a rubber damper element. Preferentially the damper element is embodied as a strip-shaped element and/or as a ring-shaped element and/or as a partial-circle element and/or as an envelope-shaped element.

It is also proposed that the mobile connection unit comprises at least two connection elements, which are pivotably connected to each other. In this way it is possible to provide an advantageously great degree of mobility of the connection unit. Especially advantageously it is thus possible to extend a range of application areas and to create a flexibly implementable invention. Preferably, in an assembled operation state the at least two connection elements are supported in such a way that they are movable with each other. Preferentially a support of the at least two connection elements is in particular decoupled from an elastic deformation of the at least two connection elements. The at least two connection elements of the mobile connection unit preferably have a shared pivot axis. The pivot axis is in particular implemented by a connection means. The connection means is in particular embodied as a bolt, in particular a plug bolt. Preferentially the bolt comprises, at least partly, a threaded section. Moreover the connection elements of the mobile connection unit in particular each comprise two pass-through openings for further connection means. The further connection means is preferably embodied as a screw-nut combination or as a plug bolt with a securing element, and is in particular configured to establish a connection, in particular in the connection region of the carrier structure. The first connection element of the mobile connection unit is preferably embodied as a hollow profile with a support opening along a longitudinal axis, in particular a longitudinal axis of the hollow profile. The hollow profile is in particular realized in a square-shaped fashion. The support opening is preferably configured for movably receiving a second connection element of the mobile connection unit. It is also conceivable that the support opening is configured for receiving the first connection element and/or the second connection element. Preferably the support opening is realized as a recess along a longitudinal axis of the hollow profile. It is further in particular conceivable that the support opening is arranged in the carrier element that is embodied as a longitudinal carrier element or in the carrier element that is embodied as a transverse carrier element. The support opening is preferentially realized in two parallel-extending side walls of the hollow profile. In particular, the first connection element and the second connection element are configured to be received in the connection region of the carrier element that is embodied as a longitudinal carrier element or in the connection region of the carrier element that is embodied as a transverse carrier element. It is moreover conceivable, for example, for the first connection element and the second connection element to be in particular embodied as hollow profiles. The second connection element is preferably at least partially embodied as a hollow profile.

Preferentially the at least two connection elements of the mobile connection unit have a range of movement relative to each other, around a shared axis, by an angle of in particular greater than 60 degrees, preferably greater than 90 degrees, preferentially greater than 120 degrees and especially preferentially greater than 180 degrees. The at least two connection elements are preferably supported in such a way that they are pivotable around an axis, in particular a shared axis.

Beyond this it is proposed that the connection device comprises at least one hollow profile. This advantageously allows reducing a weight of the connection device as well as advantageously increasing stability by way of a stability-enhancing shaping. It is in this way possible to provide an energy conversion system that is implementable in a particularly advantageously flexible manner. Preferably the hollow profile comprises a tapering, in particular in at least one end region, preferentially in the front region. Preferably, the hollow profile has in at least one front region a reduced or increased cross section, in particular relative to the cross section of the hollow profile of the carrier element that is embodied as a longitudinal carrier element or of the carrier element that is embodied as a transverse carrier element. The reduced cross section is in particular configured, in an assembled or pre-assembled state, to receive at an inner side at least a portion of the connection device in the carrier element that is embodied as a longitudinal carrier element or in the carrier element that is embodied as a transverse carrier element. The increased cross section is in particular configured, in an assembled or pre-assembled state, to receive in particular at an outer side of the hollow profile, preferably along a longitudinal direction, at least a portion of the connection device on the carrier element that is embodied as a longitudinal carrier element or on the carrier element that is embodied as a transverse carrier element.

Furthermore the hollow profile of the connection device has a reduced cross section, in particular in a front region. Preferably viewed perpendicularly to a longitudinal direction of the hollow profile, the reduced cross section has a profile that is in particular at least substantially wedge-shaped. In particular, an at least substantially wedge-shaped profile may have steps and/or rounded portions in a start region and in an end region. Further the at least substantially wedge-shaped profile may preferably have at least one curved track. In particular, the curved track is embodied in a convex or concave fashion. Moreover at least one side of the wedge-shaped profile of the reduced cross section may in particular have a polygonal and/or staggered profile. Preferentially the reduced cross section in the front region of the hollow profile shows a reduction of the cross section of the hollow profile by a relative amount of in particular more than 20%, preferably more than 30%, preferentially more than 40% and particularly preferably more than 50% relative to the original cross section of the hollow profile. Furthermore, in particular the profile of the reduced cross section preferably extends, starting from the front face, along a longitudinal direction of the hollow profile. In an assembled operation state the mobile connection unit is in particular configured to permit a pivot movement in a plane that is perpendicular to the ideal water surface.

It is also proposed that the connection device is implemented at least partially of steel. This allows providing a high resistance and load-bearing capacity of the energy conversion system, in particular making an advantageously highly flexible implementability of the energy conversion system achievable.

It is further proposed that the energy conversion system comprises at least one stabilization device, which is arranged on at least one floating unit of the floating units below a water surface of the water body and which is configured to apply at least the floating unit with a counterforce to a movement of the floating unit relative to the water surface, wherein in at least one operation state the stabilization device has a greater maximum distance from the water surface than the floating unit, in particular than a floating body of the floating unit. It is in this way possible to facilitate an advantageously stable position of the energy conversion system, in particular of the floating unit, on the water body. Advantageously it is possible to keep forces transferred from waves to the energy conversion system, in particular the floating unit, at an advantageously low level, in particular as the stabilization device is advantageously capable of acting counter to a movement of the energy conversion system, in particular the floating unit, that follows the waves. The stabilization device is preferably fixated, in particular at least substantially non-releasably fixated, on a floating body of the floating unit, on the connection device and/or on the carrier structure. By "at least substantially non-releasably" is in particular a connection of at least two elements to be understood which are separable from each other only by using separating tools, like for example a saw, in particular a mechanical saw etc., and/or using chemical separating means, like for example solvents, etc. It is however also conceivable for the stabilization device to be fixated on the floating body of the floating unit, on the connection device and/or on the carrier structure by means of a screw connection, a rivet connection, or the like. Preferentially the stabilization device comprises at least one stabilization element for a cooperation with a fluid of the water body, and comprises at least one bracing unit for an, in particular at least substantially tolerance-free, arrangement of the stabilization element. The stabilization element is preferably arranged on an underside of the energy conversion system, in particular of the floating unit. The stabilization element is preferentially arranged below the water surface, in particular in a floating state of the energy conversion system, in particular of the floating unit. Preferably the bracing unit comprises a plurality of bracing elements which connect the stabilization element with the floating body of the floating unit, with the connection device and/or with the carrier structure. The stabilization element is preferentially arranged at least partly such that it is at least substantially parallel to the water surface, in particular the ideal water surface. In particular, a main extension axis of the stabilization element extends at least substantially parallel to the, in particular ideal, water surface. A "main extension axis" of an object, in particular of the stabilization element, is in particular to mean an axis extending parallel to a longest edge of a smallest geometrical rectangular cuboid that still just completely encloses the object. It is also conceivable that the stabilization device, in particular the bracing unit, is arranged, in particular fixated, on a wave-breaker device of the energy conversion system, which is in particular arranged on the floating unit and/or on the carrier structure.

Furthermore it is proposed that in at least one operation state the stabilization device, in particular the stabilization element, has in a perpendicular direction a maximum distance from the floating unit of at least 50 cm, preferentially at least 100 cm, preferably at least 150 cm and especially preferentially at least 180 cm. It is possible to ensure a cooperation of the stabilization device with a fluid of the water body, advantageously independently from wind waves and/or swell and/or from a movement of the floating unit relative to the water surface. An undesired damage to the stabilization device due to objects floating on the water surface is advantageously preventable, in particular as it is possible for the stabilization device to be arranged at least substantially at a distance from the water surface, at least to a large extent. In particular, the maximum distance of the stabilization device, in particular the stabilization element, from the floating unit is maximally 400 cm, preferably no more than 300 cm and preferentially no more than 250 cm. The maximum distance of the stabilization device, in particular the stabilization element, from the floating unit preferably extends at least substantially perpendicularly to the ideal water surface.

In particular, a minimum distance of the stabilization device, in particular the stabilization element, from the floating unit, in particular an underside and/or a bottom of the floating unit, in particular a floating body of the floating unit, is at least 40 cm, preferably at least 80 cm, preferentially at least 120 cm and particularly preferably at least 160 cm. The bracing unit preferentially comprises at least one bracing element, which has a maximum longitudinal extension of at least 150 cm, preferably at least 170 cm and particularly preferably at least 190 cm. Preferably a bracing element or the bracing element of the bracing unit is arranged, in particular fixated, with one end on the floating unit, in particular a floating body of the floating unit, on the connection device and/or on the carrier structure. The bracing element is preferably arranged, in particular fixated, on the stabilization element with another end that faces away from the end.

Beyond this it is proposed that the stabilization device comprises at least one force transfer area for a cooperation with a fluid of the water body, said force transfer area being arranged, in particular in at least one operation state, at least largely, in particular at least substantially completely, at least substantially parallel to an ideal water surface, and the force transfer area amounting to at least 2,500 cm$^2$, preferably at least 5,000 cm$^2$, preferentially at least 7,500 cm$^2$ and particularly preferably at least 10,000 cm$^2$. It is possible to facilitate an advantageously high counterforce of the stabilization device. An advantageously directed counterforce to a movement of the energy conversion system, in particular of the floating unit, can be facilitated at least substantially parallel to the perpendicular direction relative to the water surface. This advantageously allows acting counter to a lifting and/or a sinking of the energy conversion system, in particular of the floating unit, in case of swell and/or wind waves. The force transfer area in particular amounts to maximally 30,000 cm$^2$, preferably no more than 25,000 cm$^2$ and particularly preferably maximally 20,000 cm$^2$. A main extension plane of the force transfer area preferably extends at least substantially parallel to the ideal water surface. By a "main extension plane" of an object, in particular of the force transfer area, is in particular a plane to be understood which is parallel to a largest side face of a smallest imaginary rectangular cuboid that just still completely encloses the object, the plane in particular extending through the center point of the rectangular cuboid. Especially preferentially the stabilization element forms the force transfer area.

In particular, the stabilization device, in particular the stabilization element, comprises at least one further force transfer area, which is in particular located on a side of the stabilization device, in particular of the stabilization element, that faces away from the force transfer area. Particularly preferably the force transfer area is located on a side of the stabilization device, in particular of the stabilization element, that faces towards the ideal water surface. The further force transfer area is preferably located on a side of the stabilization device, in particular of the stabilization element, that faces away from the ideal water surface. Preferentially the force transfer area and the further force transfer area are implemented such that they are congruent. It is however also conceivable for the force transfer area and the further force transfer area to be implemented differently. A main extension plane of the further force transfer area preferably extends at least substantially parallel to the ideal water surface. It is conceivable that the stabilization device comprises a plurality of stabilization elements, which in particular together form the force transfer area and the further force transfer area. A size of the force transfer area and/or of the further force transfer area is preferentially implemented to be adjustable, in particular by modular removal or addition of individual stabilization elements. For example, it is possible for the counter force acting onto the floating unit to be adapted via the force transfer areas in an application-specific manner, depending on a weight of the energy conversion system, in particular of the floating unit, and/or on a swell/on wind waves of the water body.

Furthermore a connection device, in particular the above-described connection device, is proposed.

Furthermore a floating unit, in particular the above-described floating unit, is proposed.

Moreover a method for an installation of an energy conversion system, in particular the above-described energy conversion system, is proposed.

DRAWINGS

Further advantages will become apparent from the following description of the drawings. The drawings show an exemplary embodiment of the invention. The drawings, the description and the claims contain a plurality of features in combination. Someone skilled in the art will purposefully consider the features individually and will find further expedient combinations.

Figure 1B:
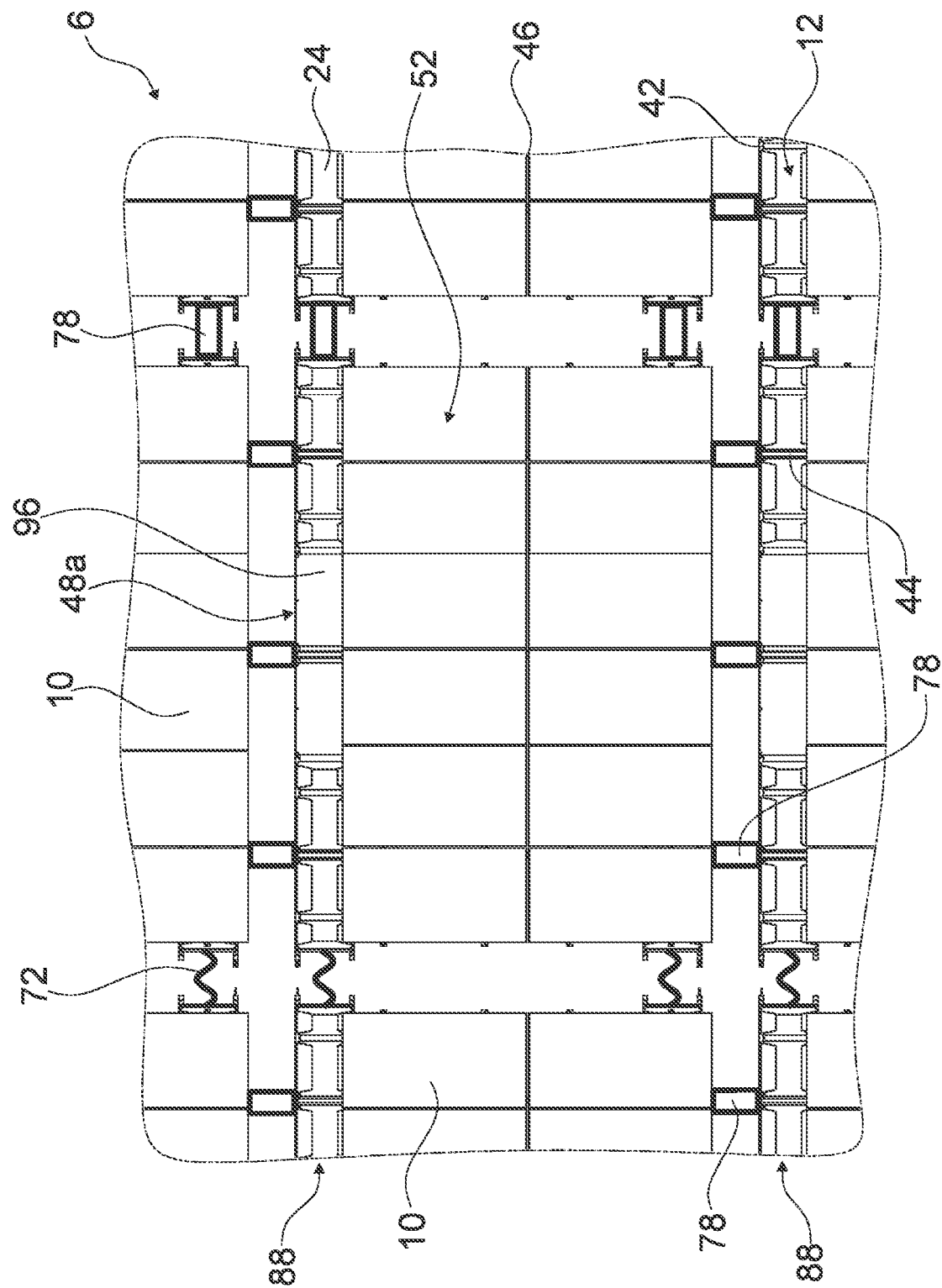
Figure 2:
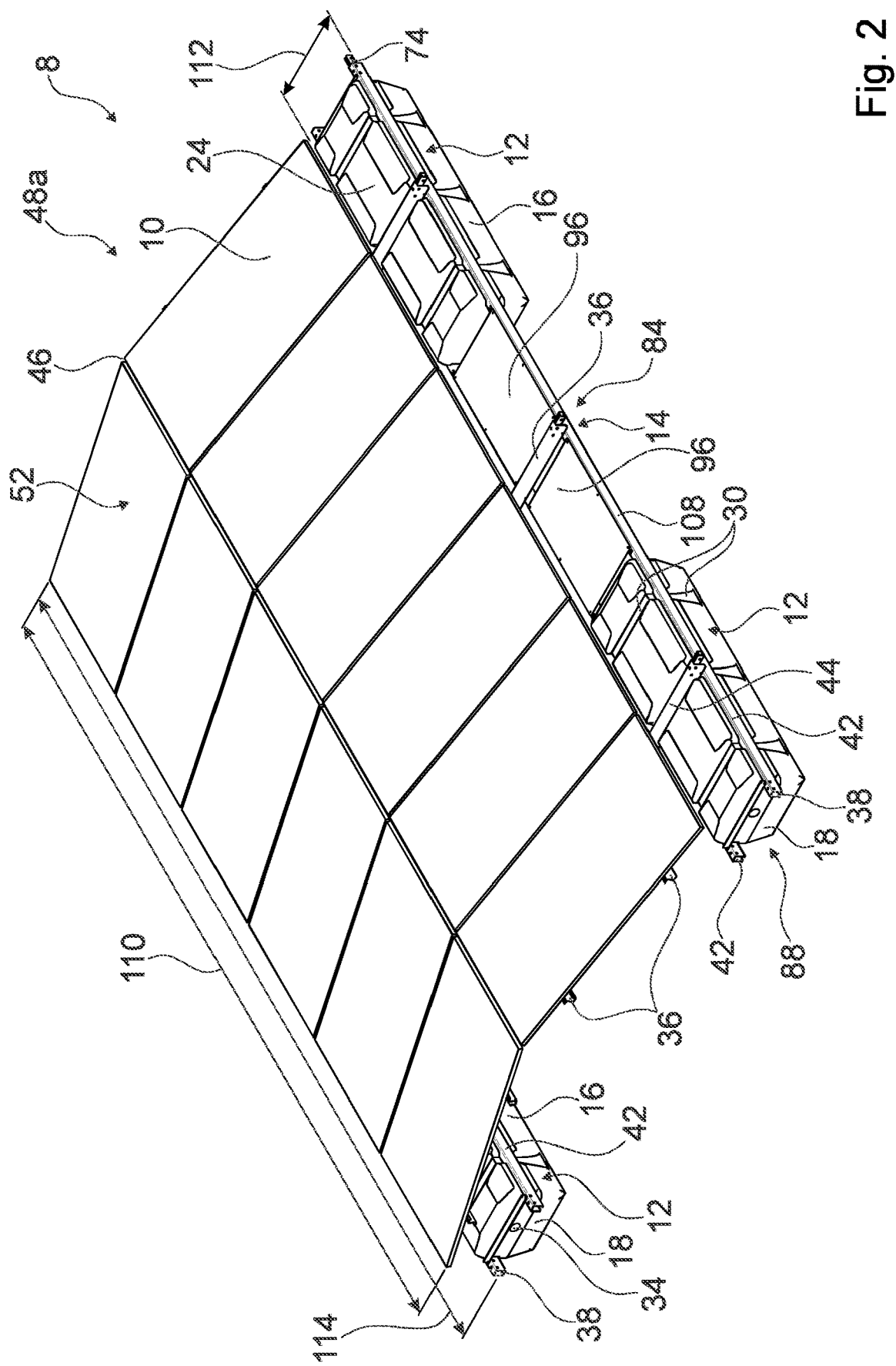
Figure 3:
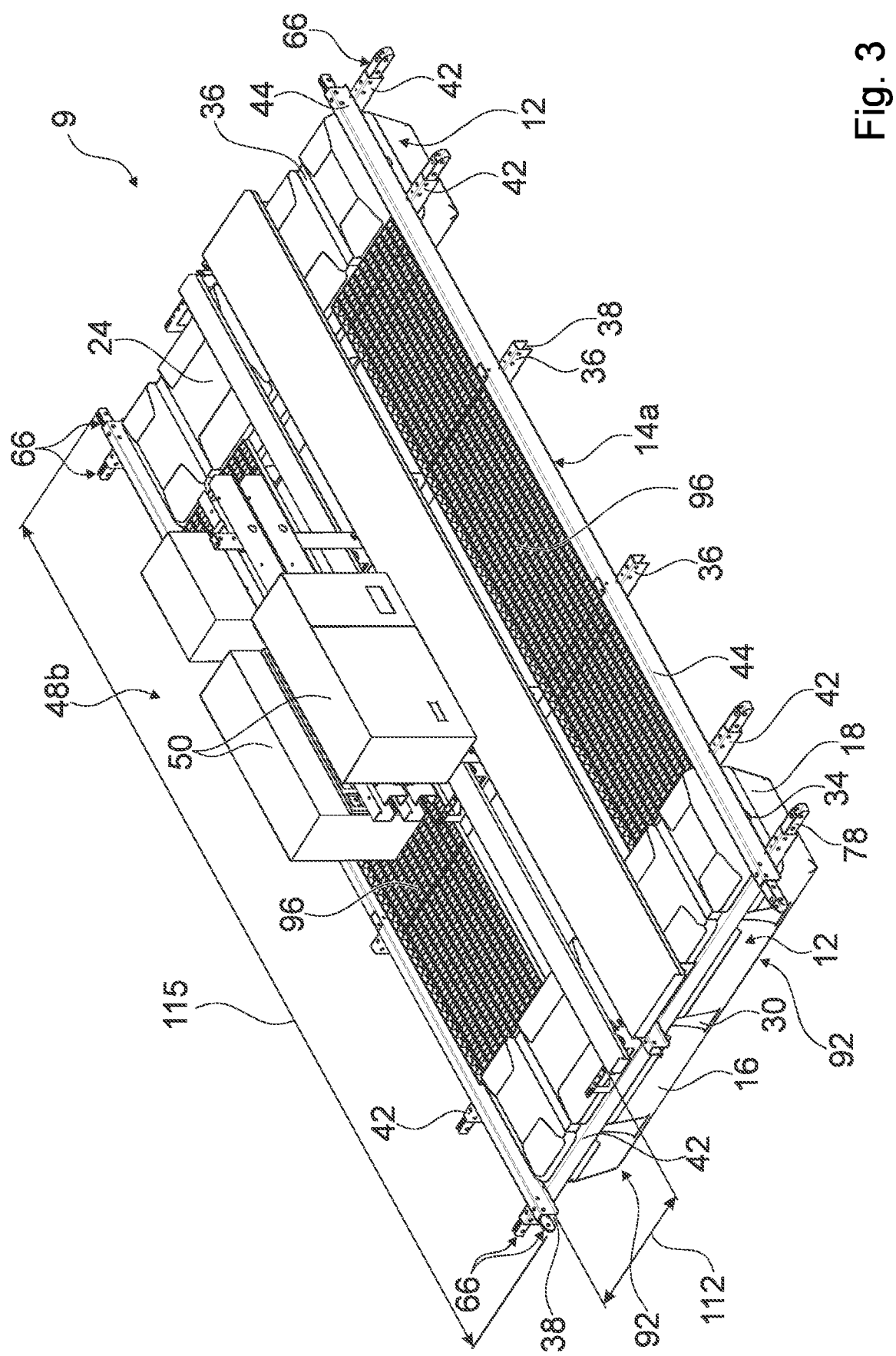
Figure 4:
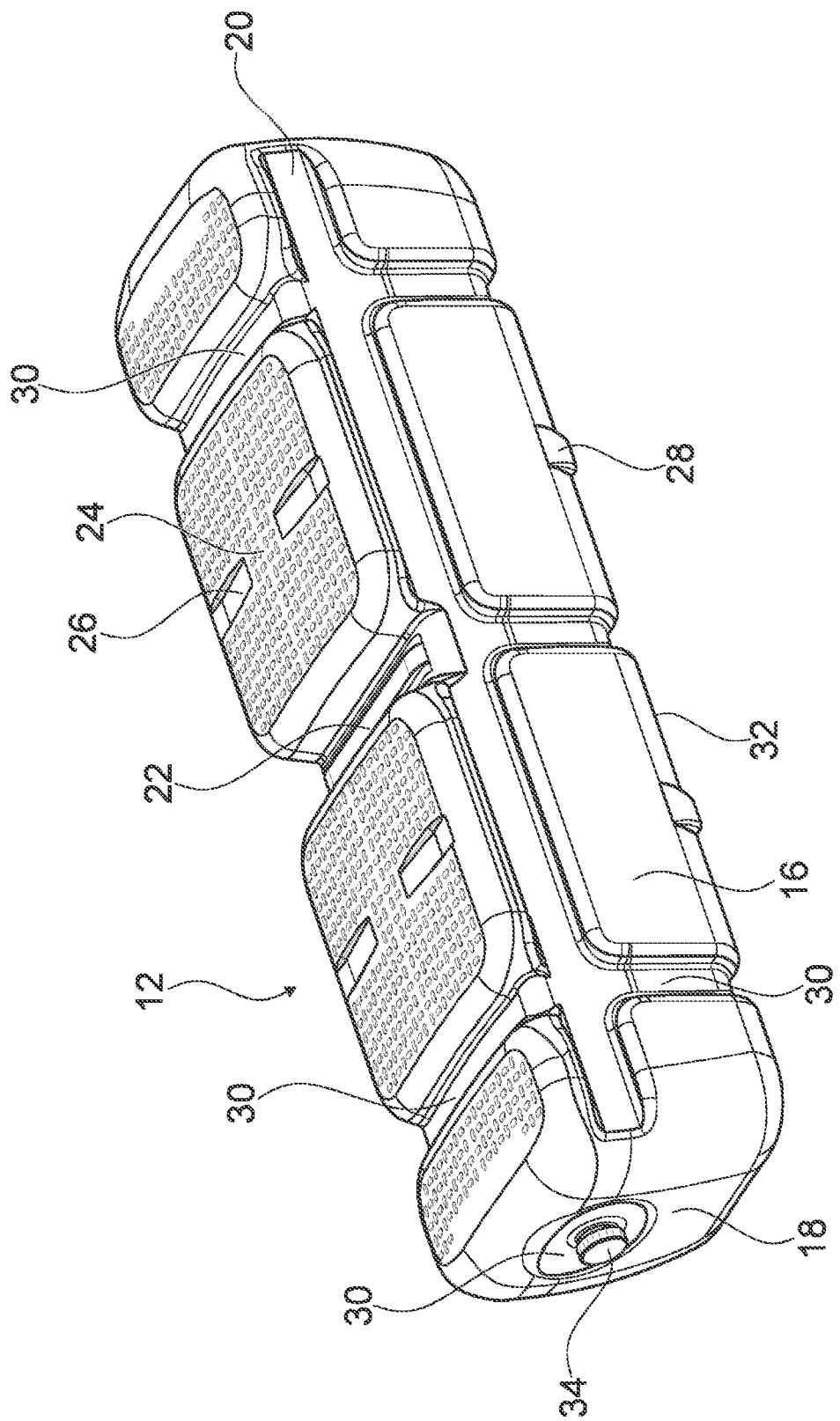
Figure 5A:
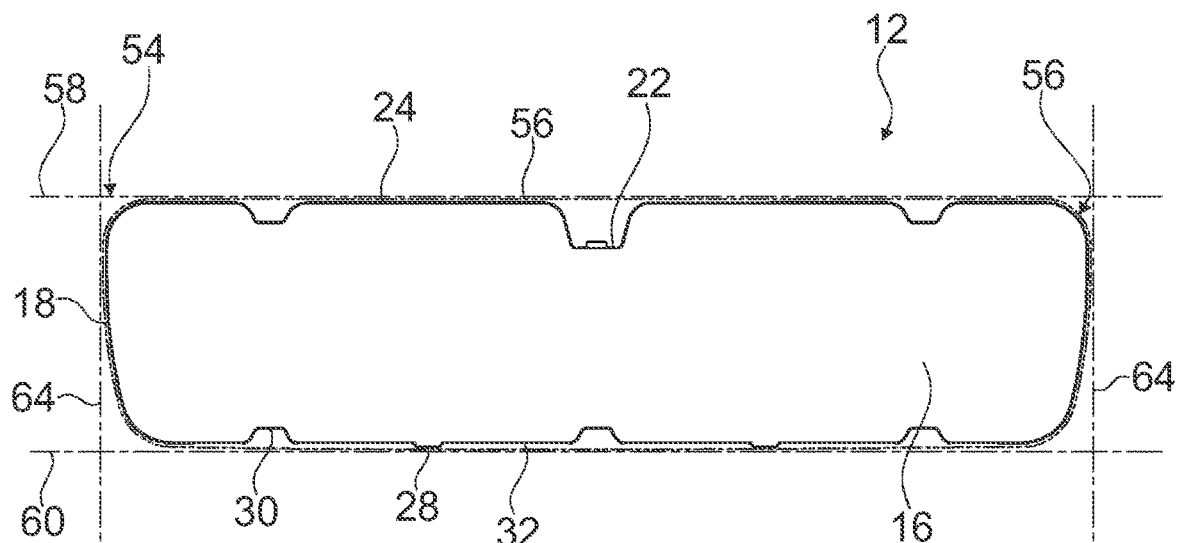
Figure 5B:
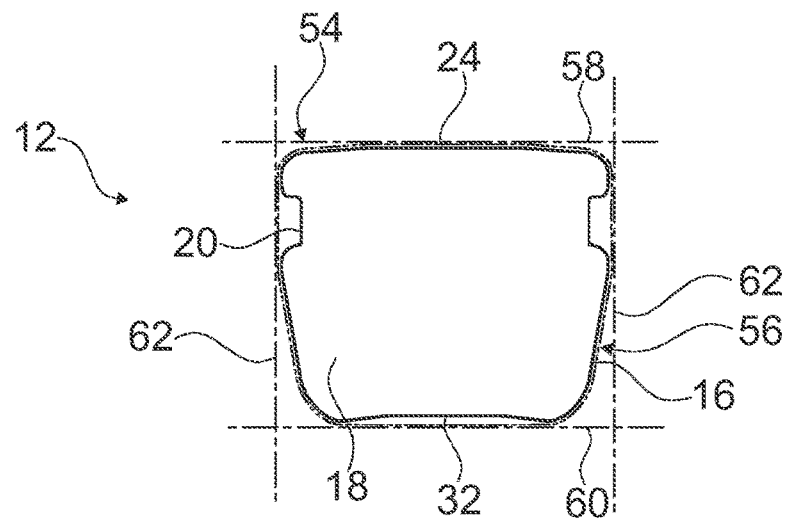
Figure 5C:
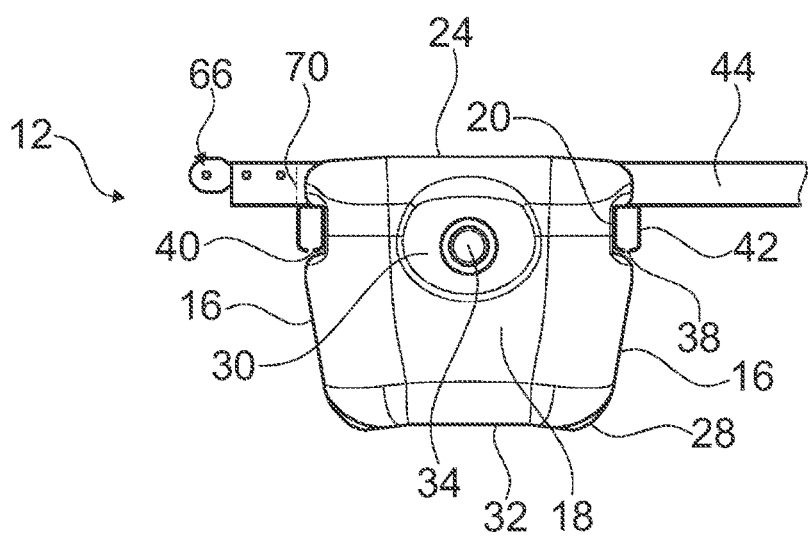
Figure 7:
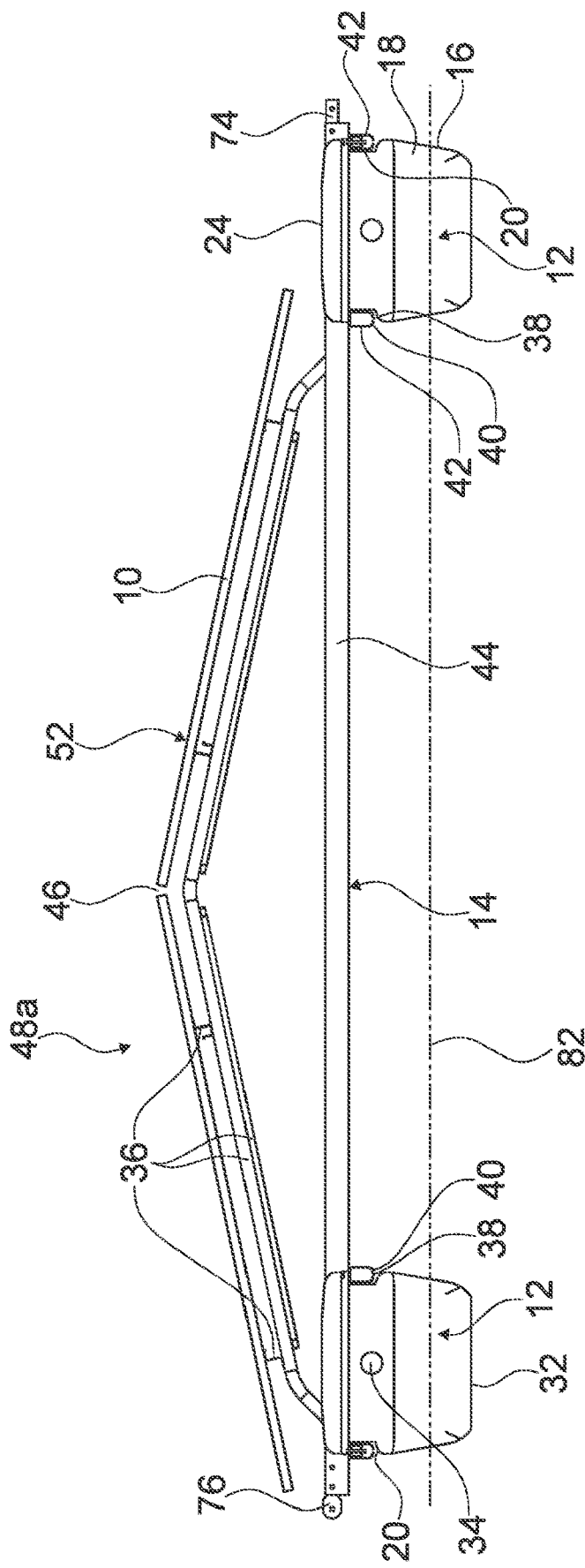
Figure 8:
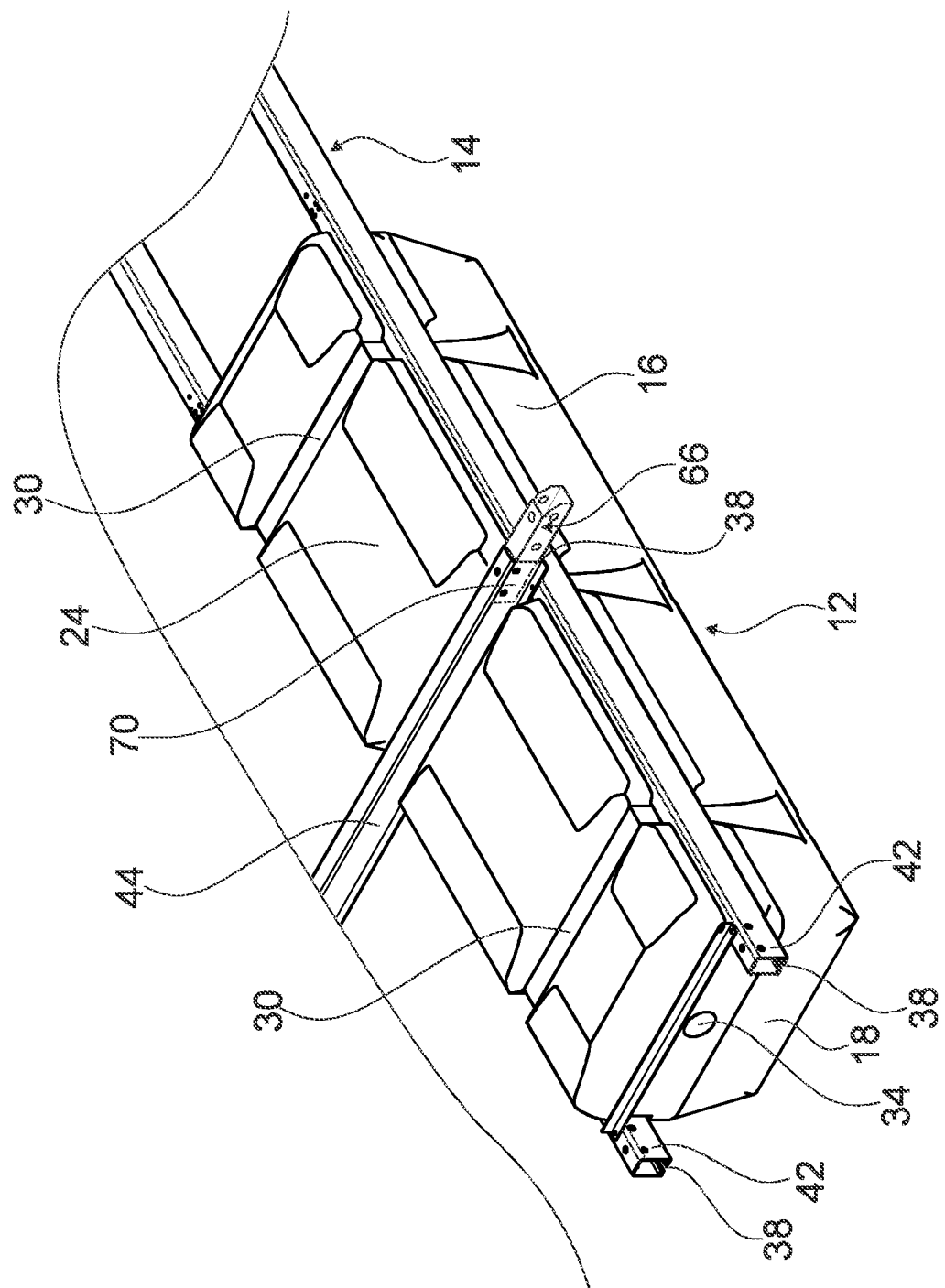
Figure 9:
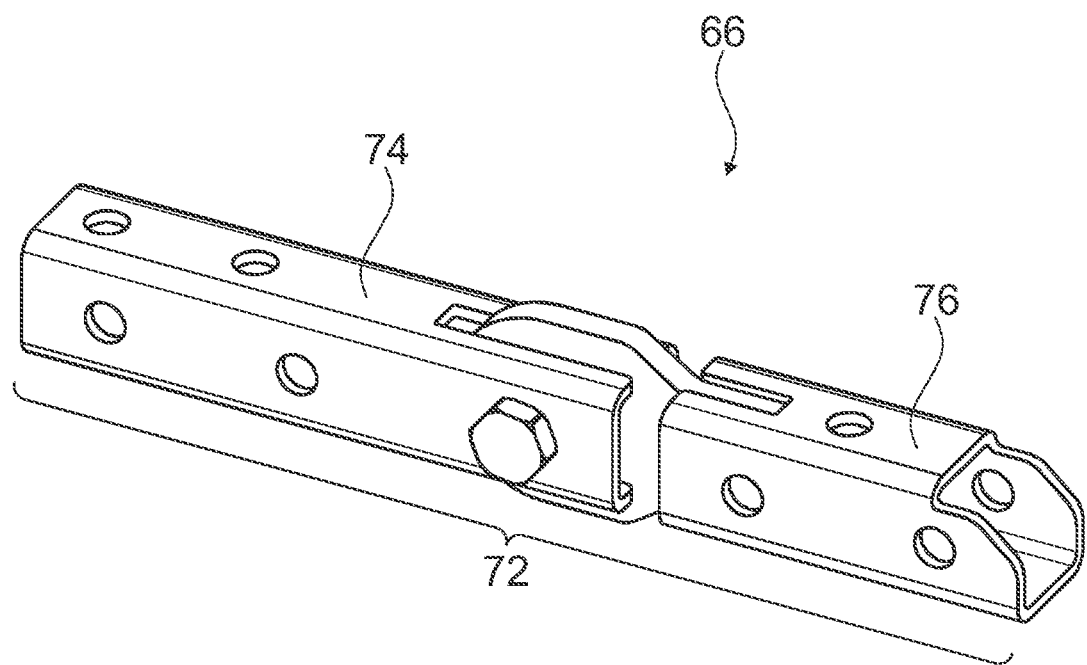
Figure 10:
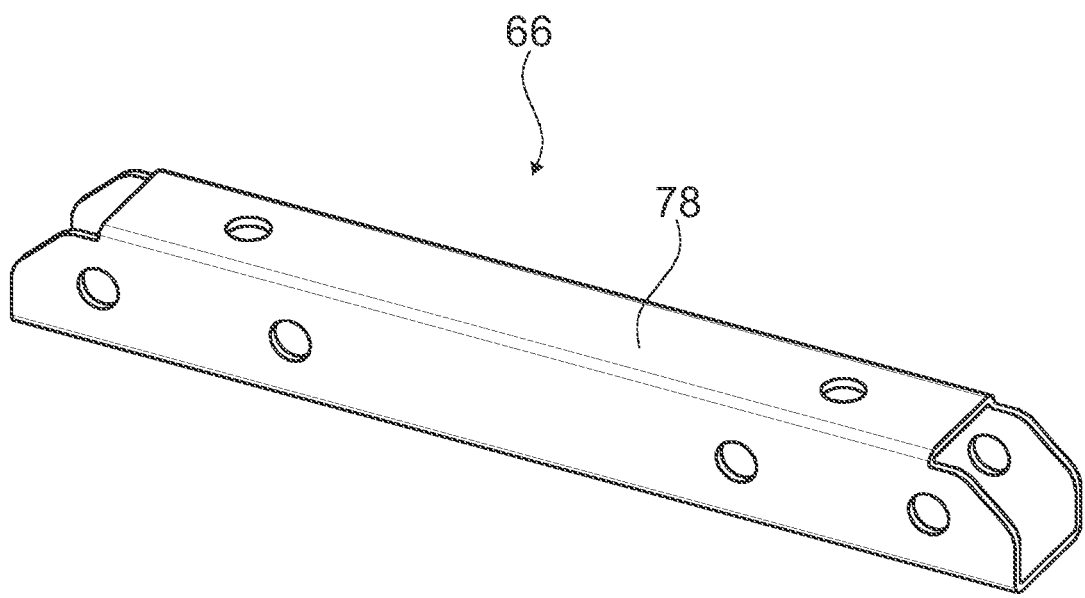
Figure 11:
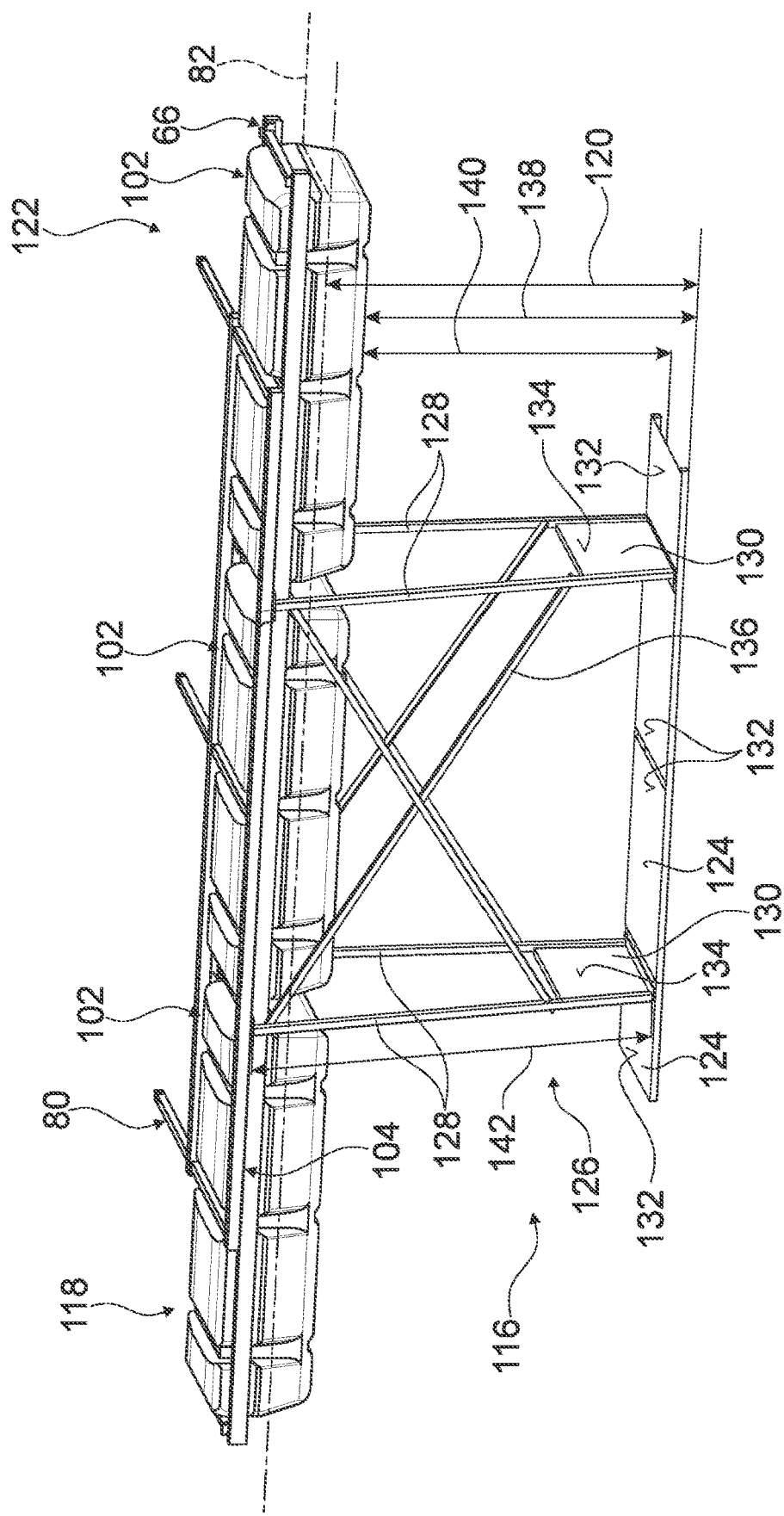
Figure 12A:
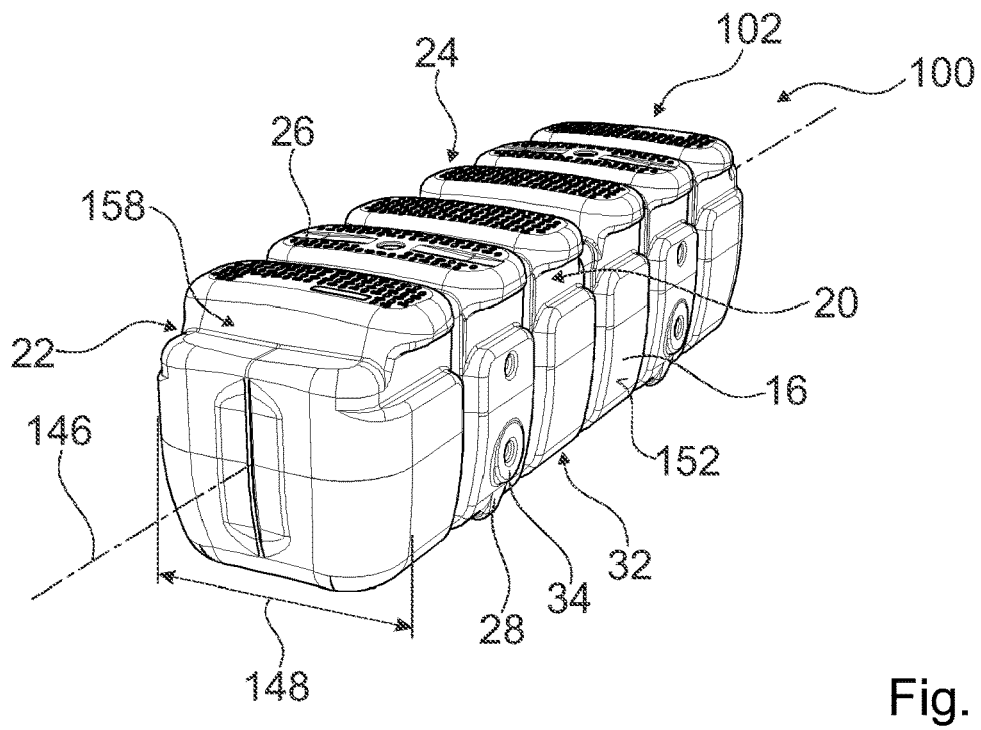
Figure 12B:
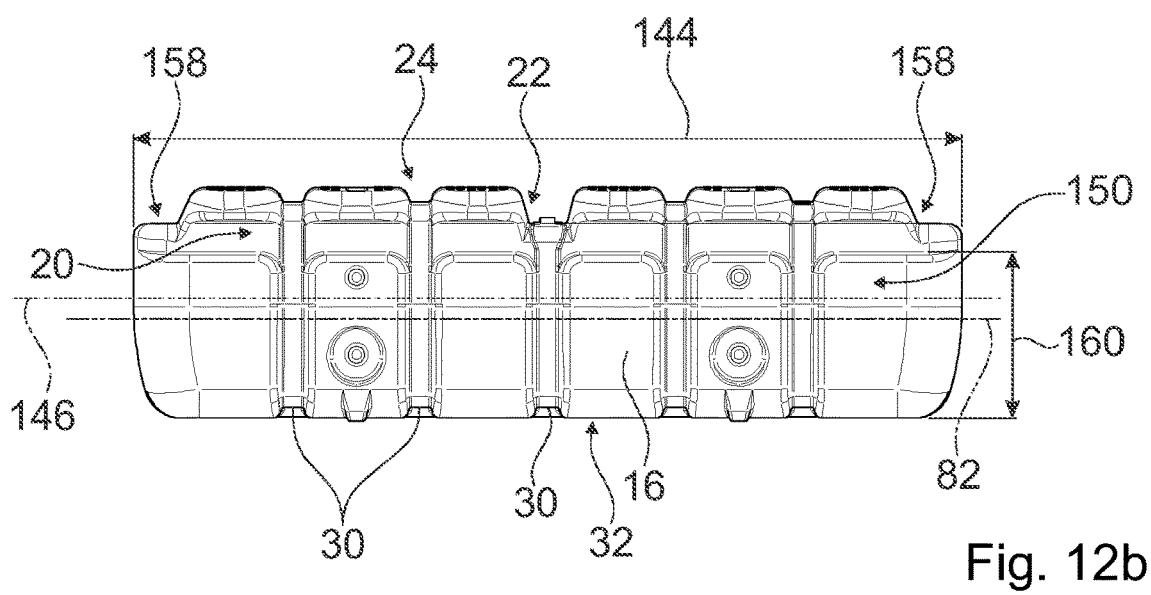
Figure 12C:
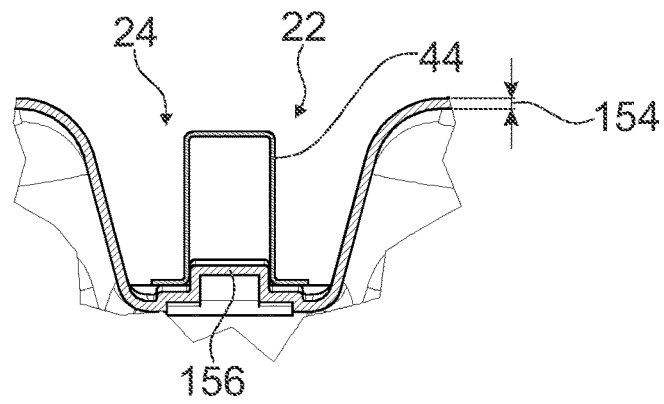
Figure 13:
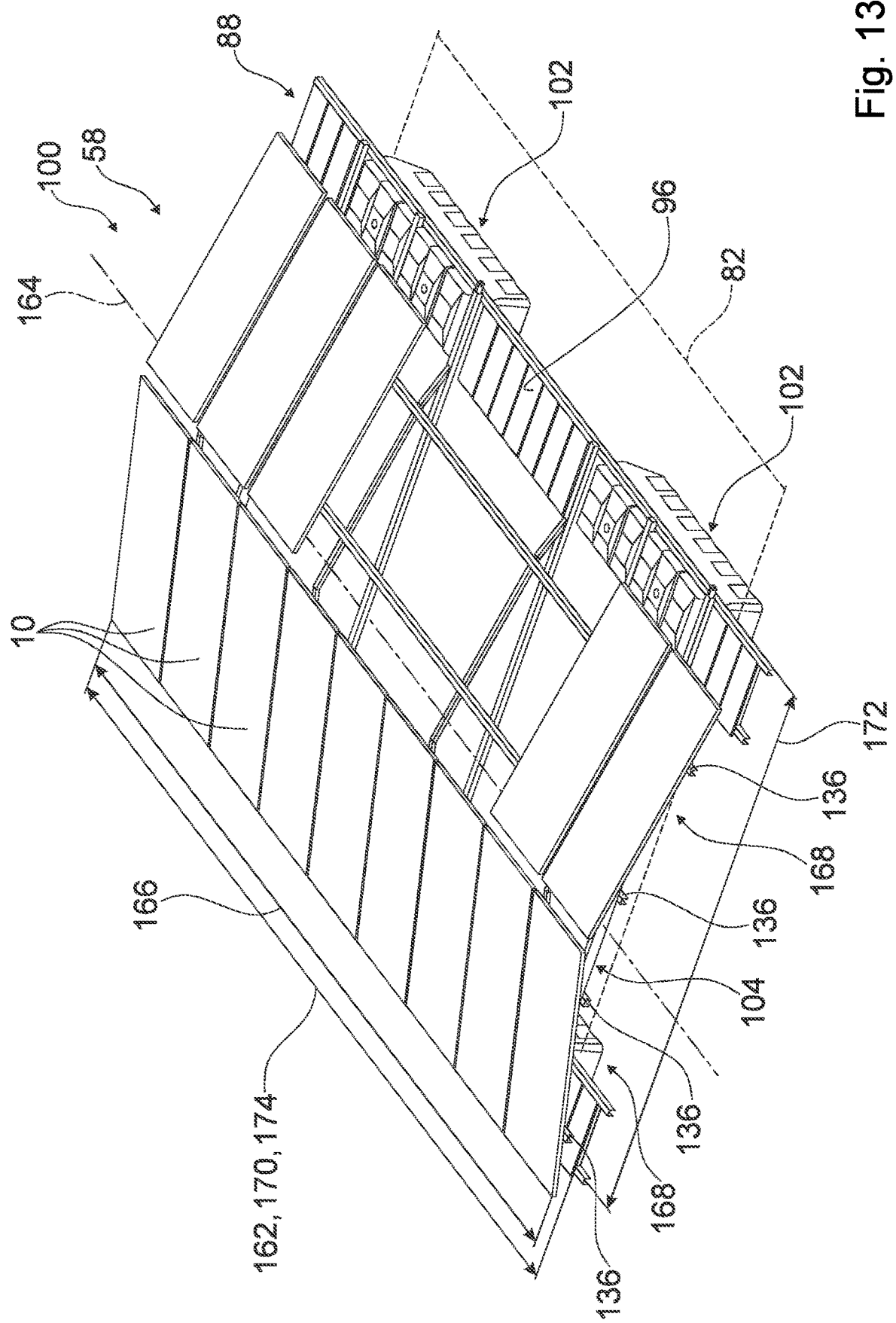
Figure 14:
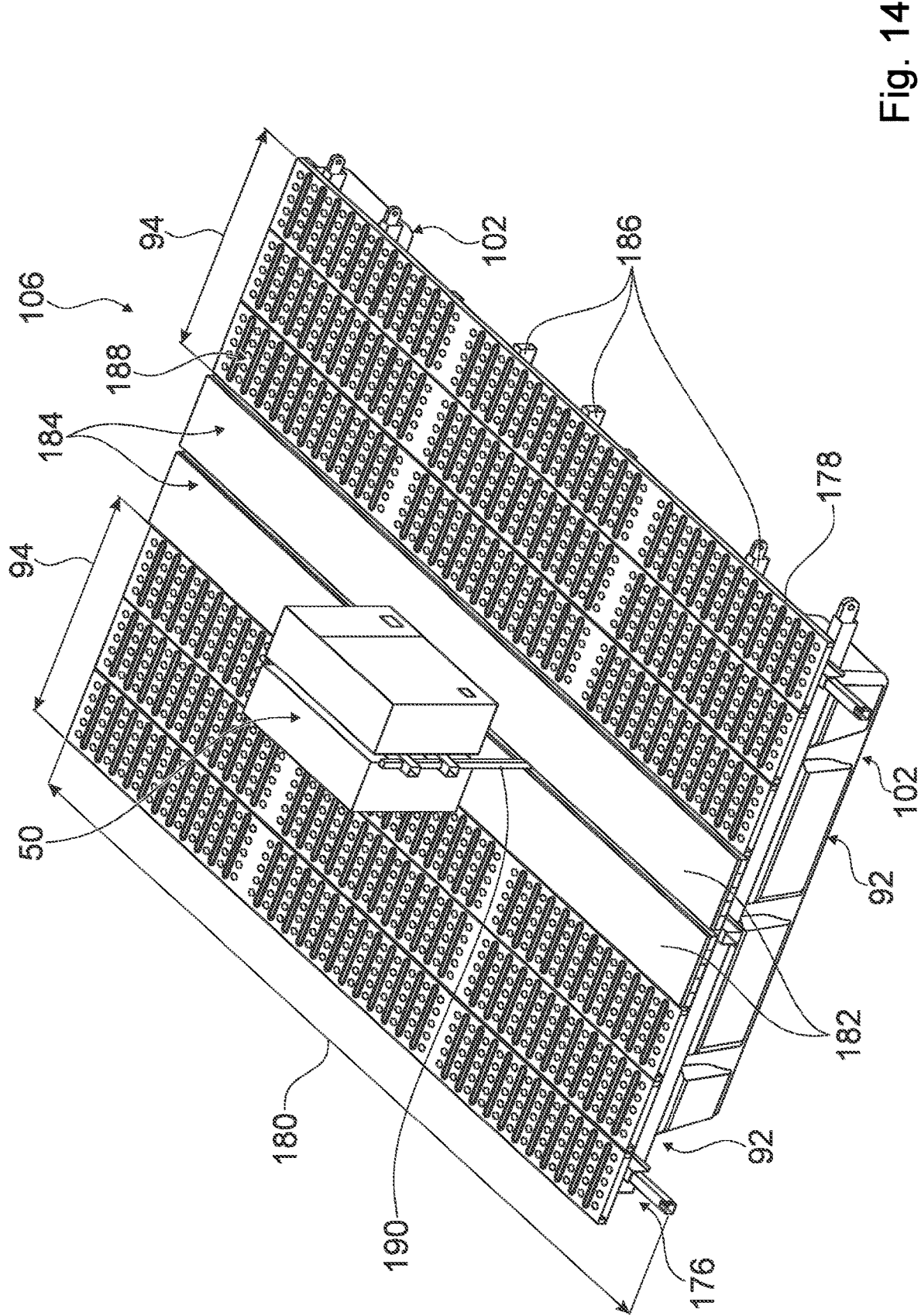

It is shown in:

FIG. 1a an overview of an energy conversion system with a plurality of floating units, four completely illustrated raft units and a wave-breaker device, FIG. 1b a view of a section of the energy conversion system in a transition region between two raft units, wherein the floating units are implemented such that they are connected to one another via rigid connection units and mobile connection units, FIG. 2 a view of a floating unit that is embodied as a floating carrier device, with an energy conversion unit comprising twelve solar elements and with schematically represented floating bodies, FIG. 3 a view of a floating unit that is embodied as a floating carrier device, with a power converter device and with schematically represented floating bodies, FIG. 4 a view of a floating body with an anti-skid structure on its upper side, a receiving region on a side face, a further receiving region on the upper side and with stack elements which are implemented and arranged correlatingly, FIG. 5a a side view of a side wall of the floating body, with a reference rectangular cuboid and with an envelope, FIG. 5b a further side view of the side wall of the floating body, with the reference rectangular cuboid and with the envelope, FIG. 5c a side view of the side wall of the floating body, which has been received in the carrier structure in a floating and form-fit manner, FIG. 6 a top view of the floating unit that is embodied as a floating carrier device, with four floating bodies and with a carrier structure implemented as a saddle roof, as well as with four solar elements and an X-shaped wind bracing, FIG. 7 a side view of the floating unit that is embodied as a floating carrier device, with the carrier structure, FIG. 8 a view of a schematically represented floating body, in an operation state when assembled in the carrier structure, with carrier elements embodied as longitudinal carrier elements and with carrier elements embodied as transverse carrier elements, FIG. 9 a view of a mobile connection unit of the connection device with two connection elements, FIG. 10 a view of a rigid connection unit of the connection device FIG. 11 a perspective view of a floating unit that is embodied as a floating carrier device, with a stabilization device, FIG. 12a a perspective view of an alternative implementation of a floating body of a floating unit that is embodied as a floating carrier device, FIG. 12b a side view of the alternative implementation of the floating body, FIG. 12c a detail view of the alternative implementation of the floating body in a receiving region on an upper side of the floating body, FIG. 13 a perspective view of an alternative implementation of a floating unit that is embodied as a floating carrier device for an accommodation of eighteen solar elements, and FIG. 14 a perspective view of an alternative implementation of a floating unit that is embodied as a floating carrier device with a power converter device.

DESCRIPTION OF THE EXEMPLARY EMBODIMENT

FIG. 1 shows an energy conversion system 6, which is configured to be arranged floating on a water body. The energy conversion system 6 is realized as a solar park. The solar park comprises an array of a plurality of floating units 48a, 48b, which are embodied as floating carrier devices 8, 9. The floating carrier devices 8, 9 and/or the floating units 48a, 48b are implemented as floating boats which float on a water surface 82 of the water body, in particular by way of floating bodies 12.

Preferentially at least one of the floating carrier devices 8 comprises an anchoring unit 84, which is configured to fixate and/or secure the floating carrier device 8 to a ground delimiting the water body, in particular to a shore or a bank and/or a bottom of the water body. In particular, the anchoring unit 84 is not shown in detail in the figures. Preferably the anchoring unit 84 is configured for a holding and/or securing of the floating carrier device 8 in a position relative to the ground against a flow and/or a swell and/or wind waves of a fluid that forms the water body. In particular, the anchoring unit 84 is arranged, in particular fixated, on a floating body 12 of the floating carrier device 8 (see FIG. 2) and/or on a carrier structure 14 of the floating carrier device 8 (see FIG. 2). The anchoring unit 84 preferentially comprises an anchor element and a connection element (not shown in the figures), with in particular the anchoring element being arranged, in particular fixated, on the floating body 12 and/or on the carrier structure 14 via the connection element. Preferably the anchoring element is configured to be fixated to the ground of the water body, in particular via a form-fit and/or force-fit connection. The anchoring element is, for example, embodied as an anchor, as a hook, as a rivet, as a screw, as a drill head, or the like. In particular, the anchoring element is at least partly sunk and/or screwed in the ground of the water body. The connection element is, for example, embodied as a lead, as a chain, as a rope, as a wire, or the like. In particular, the connection element is fixated with one end of the connection element on the anchoring element and with another end of the connection element, which is situated opposite the end, on the floating body 12 and/or on the carrier structure 14. Especially preferentially the anchoring unit 84, in particular the connection element, is arranged and/or implemented in such a way that the floating carrier device 8 is movable, relative to an anchoring position on the ground of the water body which in particular the anchoring element is arranged on, by at least 1 m, preferably by at least 3 m and particularly preferably by at least 5 m, preferably without fully tensioning the connection element, in particular for the purpose of following wind waves and/or swell. The connection element is preferably fixated on the floating body 12 and/or on the carrier structure 14 at least substantially non-releasably, by substance-to-substance bond and/or via a screw or clamp connection. Furthermore implementations are conceivable in which more than one floating carrier device 8 of the energy conversion system 6 comprises an anchoring unit 84. In particular, the anchoring units 84 are respectively arranged on a floating carrier device 8 such that they are evenly distributed over an area of the water body covered by the energy conversion system 6 and/or along an outer side of the energy conversion system 6 that delimits the energy conversion system 6. Alternatively or additionally it is conceivable that the anchoring unit 84, in particular the connection element, is arranged, in particular fixated, on a wave-breaker device 80 of the floating carrier device 8 and/or of the energy conversion system 6. It is conceivable that a floating carrier device 8 of the energy conversion system 6, comprising an anchoring unit 84, is connected with at least one further floating carrier device 8 of the energy conversion system 6, which is arranged side by side with the floating carrier device 8, in particular for the purpose of augmenting a stability of the floating carrier device 8 and/or of the energy conversion system 6. The floating carrier device 8 comprising the anchoring unit 84 preferably comprises at least one coupling element (not shown in the figures), preferentially a plurality of coupling elements, which is in particular configured for an at least substantially rigid connection and/or fixation of the floating carrier device 8 and the further floating carrier device 8 with one another. In particular, the coupling element is configured for a securing and/or holding of the floating carrier device 8 and the further floating carrier device 8 against a tilting relative to one another. The coupling element is preferably connected with and/or fixated to a carrier structure 14 and/or a connection device 66 of the floating carrier device 8. Preferentially the coupling element is connected with and/or fixated to a carrier structure 14 and/or a connection device 66 of the further floating carrier device 8.

The floating carrier devices 8 of the energy conversion system 6 are preferably implemented and/or arranged in such a way that the energy conversion system 6 comprises a plurality of walkable alleyways 88 over a large portion of a maximum longitudinal extension 86 of the energy conversion system 6, in particular over an at least substantially entire maximum longitudinal extension 86 of the energy conversion system 6. Preferentially the floating carrier devices 8 of the energy conversion system 6 are implemented and/or arranged in such a way that the energy conversion system 6 comprises a further walkable alleyway 92 over a large portion of a maximum transverse extension 90 of the energy conversion system 6, in particular over an at least substantially entire maximum transverse extension 90 of the energy conversion system 6. The alleyways 88 and/or the further alleyway 92 preferably have/has a maximum transverse extension 94 of at least 80 cm, preferably at least 90 cm and preferentially at least 100 cm. In particular, the alleyways 88 and/or the further alleyway 92 are/is implemented of bottom elements 96 and floating bodies 12 of the floating carrier devices 8 of the energy conversion system 6, which are in particular arranged in at least one row, at least substantially parallel to the maximum longitudinal extension 86 of the energy conversion system 6 or to the maximum transverse extension 90 of the energy conversion system 6.

The energy conversion system 6 in particular comprises a plurality of alleyways 88 and a plurality of further alleyways 92. In particular, a number of alleyways 88 of the energy conversion system 6 corresponds to a number of floating carrier devices 8 of the energy conversion system 6 which are arranged successively in a direction that is oriented at least substantially perpendicularly to the maximum longitudinal extension 86 of the energy conversion system 6. In particular, each floating carrier device 8 of the energy conversion system 6 forms at least a portion of an alleyway 88 and/or of a further alleyway 92.

FIG. 2 shows an overview of a floating carrier device 8 with twelve mounted solar elements 10. Particularly preferably the floating carrier device comprises twelve solar elements 10. The floating carrier device 8 comprises four floating bodies 12. Furthermore the floating carrier device 8 comprises the carrier structure 14 that is coupled with the floating bodies 12. It is further conceivable for the floating carrier device 8 to comprise a greater or a smaller number of floating bodies 12. For example, the floating carrier device 8 could comprise two or three or five floating bodies 12. It is also conceivable that the floating carrier device 8 accommodates a greater or a smaller number of solar elements 10. For example, the floating carrier device 8 could accommodate two or eight or fourteen solar elements 10.

The floating carrier device 8 is configured to support an energy conversion unit 52 floating on a water body, the energy conversion unit 52 comprising twelve photovoltaic modules that are embodied as solar elements 10. Principally the energy conversion unit 52 preferably comprises eighteen photovoltaic modules that are embodied as solar elements 10. The solar elements 10 are realized as photovoltaic modules. The photovoltaic modules are configured for a conversion of solar radiation energy into electrical current. The floating carrier device 8 implements a floating unit 48a with four floating bodies 12. Furthermore, the floating carrier device 8 with the carrier structure 14 is configured to transfer a support force of the twelve solar elements 10 to the four floating bodies 12.

Moreover, a carrier structure 14a is configured to transfer a support force from a power converter device 50 to two floating bodies 14 (see FIG. 3). The power converter device 50 is embodied as a power inverter. The power inverter is configured to change a direct current generated by the solar elements 10 of several floating units 48b into an alternating current. The power inverter is realized with a power output of 40 VA. A maximum input voltage of the power inverter is 1100 V DC. An output voltage of the power inverter is 400 V AC.

The floating carrier device 8, 9, in particular the floating carrier device 8, 9 shown in FIG. 2 and/or a floating carrier device 8, 9 shown in FIG. 3, preferably comprises a plurality of bottom elements 96, which are arranged on the carrier structure 14. The bottom elements 96 are configured, in particular together with the floating bodies 12, to form a walkable surface of the floating carrier device 8, 9. The bottom elements 96 are in particular embodied as step plates.

Other implementations of the bottom elements 96 are also conceivable. Preferentially the bottom elements 96 are configured to be arranged between the floating bodies 12. Preferably the bottom elements 96 are fixated on the carrier structure 14. For example, the bottom elements 96 each comprise, on at least two sides facing away from each other, respective receptacles which are configured for a fixation on a carrier element 36 and/or on a bracing element 108 of the carrier structure 14. In particular, the bottom elements 96 lie upon the carrier structure 14 via the receptacles. The bottom elements 96 are preferably embodied at least substantially in the shape of panels. Preferably the bottom elements 96 delimit a plurality of pass-throughs, in particular such that they are distributed over a main extension plane of the bottom elements 96 (not shown in FIG. 2; see FIGS. 3, 13 and 14). In a state when the bottom elements 96 are fixated, in particular mounted, on the carrier structure 14, the pass-throughs extend from an upper side of the bottom elements 96 over an entire height of the bottom elements 96 to an underside of the bottom elements 96. The pass-throughs are preferably configured for conveying water through the bottom elements 96 from the upper side of the bottom elements 96 in a perpendicular direction. The pass-throughs are preferentially configured to at least substantially prevent a retention of water on the bottom elements 96. The bottom elements 96 are preferably embodied at least partly in an anti-skid fashion, in particular on an upper side of the bottom elements 96. In a preferred implementation the bottom elements 96 form edgings delimiting the pass-throughs (not shown in the figures) and having an anti-skid effect. For example, the pass-throughs are embodied in a round or in an angular manner. The pass-throughs and/or the edgings of one bottom element 96 preferentially feature a plurality of differing implementations. The bottom elements 96 are preferably embodied of aluminum or of, in particular furrowed or perforated, sheet metal. However, other implementations of the bottom elements 96 are also conceivable.

In particular in the implementation of the floating carrier device 8 shown in FIG. 2, bottom elements 96 of the floating carrier device 8 form, together with floating bodies 12 of the floating carrier device 8, an alleyway 88 that extends on one side of the solar elements 10. Preferentially the alleyway 88 extends at least substantially completely over a maximum longitudinal extension 110, 114 of the solar elements 10 and/or of the floating carrier device 8. In particular in the implementation of the floating carrier device 9 shown in FIG. 3, bottom elements 96 of the floating carrier device 9 form, together with floating bodies 12 of the floating carrier device 9, two further alleyways 92, which extend on two sides of the power converter device 50. In particular, the alleyway 88 and/or the alleyways 92 have/has a maximum transverse extension 112 of at least 80 cm, preferably at least 90 cm and preferentially at least 100 cm. Preferentially the two further alleyways 92 respectively extend at least substantially completely over a maximum longitudinal extension 115 of the floating carrier device 9, in particular the floating carrier device 9 shown in FIG. 3. Particularly preferably the power converter device 50, in particular the power converter device 50 shown in FIG. 3, is embodied to be walkable via the two further alleyways 92, in particular the bottom elements 96 and/or the floating bodies 12 of the floating carrier device 9.

In FIG. 4 the floating body 12 is represented. The floating body 12 is configured for a generation of a buoyancy force. The floating body 12 is furthermore implemented as a closed hollow body. The floating body 12 is implemented of a single contiguous hollow space. Furthermore the floating body 12 comprises a closure element 34. The closure element 34 is embodied as a screw lid. The closure element 34 is configured for a closure of a single opening of the floating body 12. Furthermore the closure element 34 is configured for a water-tight closure. The closure element 34 is, in at least one operation state, embodied as an air-tight closure. The closure element 34 comprises a pressure-compensation valve. Principally it is conceivable for the closure element 34 to be realized free of a pressure-compensation valve. Herein temperature-dependent expansion and/or compression of the floating body 12 are/is compensated within a range of an elastic deformability of the floating body 12. The pressure-compensation valve comprises an airtight closure in at least one operation state. In a further operation state the pressure-compensation valve is implemented to be air-permeable, which is the case if a certain overpressure or negative pressure has been reached in the floating body 12. The floating body 12 is furthermore realized having a length of approximately 1.98 m, a width of approximately 0.59 m and a height of approximately 0.49 m. The four floating bodies 12 are configured to support a total load of approximately 1820 kg above an ideal water surface 82. The floating body 12 has a volume of approximately 455 liters. Principally it is advantageously also conceivable that the floating body 12 has a volume of 900 liters, the four floating bodies 12 being configured to support a total load of 3600 kg above an ideal water surface.

Each floating body 12 comprises on two side walls 16 a receiving region 20 for the carrier structure 14, 14a. The side wall 16, 18 of the floating body 12 is a wall of the floating body 12 whose envelope section faces toward a reference side face 62, 64 of a smallest imaginary reference rectangular cuboid 54, the reference rectangular cuboid 54 just still completely enclosing the floating body 12 (see FIG. 5a, 5b). Preferably an envelope 56 is a geometrically smallest free geometry enveloping a body. The envelope 56 is free of inflection points. In an assembled operation state of the floating body 12 the smallest imaginary rectangular cuboid 54 comprises a reference upper side 58 and a reference underside 60. The reference upper side 58 and the reference underside 60 are arranged at least substantially parallel to the ideal water surface 82. The reference rectangular cuboid 54 comprises four reference side faces 62, 64. In an assembled operation state the reference side faces 62, 64 are arranged perpendicularly to the ideal water surface 82. The two reference side faces 62 and the two reference side faces 64 are arranged respectively parallel to one another. A surface of the floating body 12 faces towards a reference surface if a surface normal of the envelope section of the floating body 12, relative to a reference surface normal of the respective reference surface of the reference rectangular cuboid 54, comprises a parallel component having a total value of more than/equal to 50% of the total value of the surface normal. The four side walls 16, 18 are configured to connect an upper side 24 and an underside 32 of the floating body 12 to each other. Two envelope sections of two side walls 16 of the four side walls 16, 18 respectively face towards a reference side face 62 of the reference side faces 62, 64. Two envelope sections of two further side walls 18 of the four side walls 16, 18 respectively face towards a different reference side face 64 of the reference side faces 62, 64.

The receiving region 20 is arranged on two side walls 16 (cf. FIG. 4). The two reference side faces 62 of the side walls 16 are arranged parallel to one another. The receiving region 20 provides for the carrier structure 14, 14a a support surface for a support of support forces. The receiving region 20 comprises a receiving contour. The receiving contour is configured for a delimitation of the receiving region 20. The receiving region 20 is furthermore implemented as a deepening. The deepening is implemented as a combination of a U-shape and a V-shape, the flanks of the U-shape being formed in a V-shape. The receiving region 20 on the side wall 16 has a cross section increasing in the direction of the reference surface normal of the allocated reference side face 62. The receiving region 20 has a smallest cross section in a deepest point in the floating body 12. Starting from the deepest point of the receiving region 20 in the floating body 12, the cross section of the receiving region 20 increases in the direction of a reference surface normal.

The floating body 12 further comprises on its upper side 24 a further receiving region 22 for the carrier structure 14, 14a, which is also shown in FIG. 4. The upper side 24 has a curved surface. The curved upper side 24 of the floating body 12 is implemented in a convex fashion. As a result of this, in particular a stability of the floating body 12 is advantageously augmented. In an assembled operation state the upper side 24 of the floating body 12 is arranged above the ideal water surface 82 and is furthermore spaced apart from the ideal water surface 82.

The further receiving region 22 is arranged on the upper side 24 of the floating body 12. The further receiving region 22 provides for the carrier structure 14, 14a a support surface for a support of support forces. The further receiving region 22 comprises a receiving contour. The receiving contour is configured for a delimitation of the further receiving region 22. The further receiving region 22 is furthermore implemented as a deepening. The deepening is implemented as a combination of a U-shape and a V-shape, the flanks of the U-shape being formed in a V-shape.

The further receiving region 22 on the upper side 24 of the floating body 12 has a cross section increasing in the direction of the reference surface normal of the allocated reference upper side 58. The further receiving region 22 has a smallest cross section in a deepest point in the floating body 12. Starting from the deepest point of the further receiving region 22 in the floating body 12, the cross section of the further receiving region 22 increases parallel to a direction of the reference surface normal. In a valley bottom of the further receiving region 22 a contour is realized for receiving a carrier element 44 that is embodied as a transverse carrier element. The contour is realized to be correlating with a contour of the hollow profile of the carrier element 44 embodied as a transverse carrier element. The contour is implemented for a centering of the carrier element 44 embodied as a transverse carrier element in the further receiving region 22 (see FIG. 4).

Furthermore the receiving region 20 and the further receiving region 22 are embodied integrally with the floating body 12. The receiving region 20 and the further receiving region 22 are formed in one piece with the floating body 12. The receiving region 20 and the further receiving region 22 have an increased material thickness relative to other wall regions. The receiving region 20 and the further receiving region 22 have a material thickness of up to 10 mm. Other regions have a minimum material thickness of up to 2 mm. Due to the increased material thickness in the receiving region 20 and the further receiving region 22, a temperature-dependent expansion or contraction of the floating body 12 is advantageously realized rather in regions having a comparably smaller material thickness. The floating body 12 has a deepening that implements the receiving region 20 and the further receiving region 22. The receiving region 20 and the further receiving region 22 and the floating body 12 are formed from one piece. The floating body 12 is produced at least substantially by an extrusion blow procedure. The floating body 12 is made of a food-safe HDPE synthetic material. The floating body 12 furthermore has an additive coloring. The floating body 12 furthermore has an additive UV protection. Moreover the receiving region 20 and the further receiving region 22 as well as the floating body 12 are produced from a blank by an extrusion blow procedure.

The receiving region 20 and the further receiving region 22 are furthermore configured for a form-fit accommodation of the carrier structure 14, 14a, which is shown in FIG. 5c and FIG. 8. The carrier structure 14, 14a is in a geometrical engagement with the receiving region 20 and with the further receiving region 22. The floating body 12 is in an assembled operation state free of penetrations of an outer shell. The carrier elements 36 partially enclose the floating body 12. Carrier elements 12 realize a form-fit around the floating body 12. In an assembled operation state the form-fit is configured for a delimitation of a horizontal and vertical movement of the floating body 12. The form-fit accommodation is free of fixation means entering the floating body 12. The form-fit accommodation is implemented non-destructively with respect to an outer shell of the floating body 12. The support surfaces of the receiving region 20 and of the further receiving region 22 are configured to transfer support forces from the carrier structure 14, 14a to the floating body 12 via the form-fit accommodation. In an assembled operation state the support surfaces are partially spaced apart from the carrier structure 14, 14a. The form-fit accommodation of the carrier structure 14, 14a permits, in an assembled operation state, a movement range to the floating body 12. The carrier structure 14, 14a permits a movement by up to 3 mm in a direction parallel to the reference surface normal of the reference side faces 62, 64. Regarding a possible movement of the floating body 12 in a direction parallel to the reference surface normals of the reference upper side 58 or of the reference underside 60, the carrier structure 14, 14a permits the floating body 12 a movement range by up to 10 mm.

The floating body 12 further comprises a total number of eight stack elements 26, 28, which are embodied in such a way that they geometrically correlate with each other and are arranged in such a way that they correlate with each other (see FIG. 4). The four first stack elements 26 are embodied such that they correlate with the four further stack elements 28. Furthermore the four first stack elements 26 are arranged such that they correlate with the four further stack elements 28. The four first stack elements 26 are arranged on the upper side 24 of the floating body 12. The four further stack elements 28 are arranged on the underside 32 of the floating body 12. The stack elements 26, 28 are configured to bring about a lateral form-fit engagement of two floating bodies 12 with each other. A middle axis through center points of the reference upper side 58 and the reference underside 60 is perpendicular both to the reference upper side 58 and to the reference underside 60.

The stack elements 26, with respect to the center point of the reference upper side 58, are arranged to be correlating with the stack elements 28, with respect to the center point of the reference underside 60.

In a projection of the arrangement of the stack elements 26 onto the reference upper side 58 and a projection of the arrangement of the stack elements 28 onto the reference underside 60, the stack elements 26, 28 are arranged to be correlating relative to the shared middle axis of the reference upper side 58 and the reference underside 60.

The stack elements 26, 28 are furthermore implemented integrally with the floating body 12. The stack elements 26, 28 are formed in one piece with the floating body 12. The stack elements 26, 28 and the floating body 12 are formed from one piece. The stack elements 26, 28 and the floating body 12 are produced in a shared production step. Furthermore the stack elements 26, 28 are implemented together with the floating body 12 from one blank. The stack elements 26, 28 are further implemented as a macroscopic structure. The stack elements 26, 28 have a rectangle shape and a flat V-shape. The four stack elements 26 are embodied as deepenings. The four further stack elements 28 are implemented as elevations implemented to be correlating with the deepenings. The deepenings of the stack elements 26 are respectively implemented to be geometrically correlating with the elevations of the further stack elements 28. Starting from the surface of the upper side 24 of the floating body 12, along the direction of the reference surface normal of the reference underside 60, the deepenings of the stack elements 26 have a maximum penetration depth of 16 mm. Starting from the surface of the underside 32 of the floating body 12, in a direction of the reference surface normal of the reference underside 60, the elevations of the further stack elements 28 show a maximum protrusion of 5 mm.

Furthermore the floating body 12 has an anti-skid implementation on its upper side 24. Relative to a smooth surface of the upper side 24 of the floating body 12, the outer surface of the upper side 24 of the floating body 12 has an increased anti-skid implementation in regard to a slip-enhancing substance, e.g. water. In particular, the anti-skid implementation is embodied integrally with the floating body 12. The anti-skid implementation is realized as a profiling. The anti-skid implementation is implemented as a macroscopic structure. The macroscopic structure is implemented as a planar arrangement of elevations. The elevations extend perpendicularly to a plane spanned by a surface of the upper side 24 of the floating body 12. The elevations have a maximum extension of 5 mm perpendicularly to a plane spanned by a surface of the upper side 24 of the floating body 12. The macroscopic structure is implemented of an ellipse-shaped nub structure. The nub structure has a regular pattern (see FIG. 4).

In an assembled operation state the floating body 12 has at least partially a decreasing maximum transverse extension perpendicularly to the ideal water surface 82, along a direction from the upper side 24 to the underside 32 of the floating body 12.

Furthermore, in an operation state when floating and assembled, the floating body 12 is arranged at least partially above the water surface 82. In a state when floating and assembled, the floating body 12 receives the carrier structure 14, 14a of the floating carrier device. In a state when floating and assembled, the upper side 24 of the floating body 12 is situated above the water surface 82. The underside 32 of the floating body 12 is embodied in a curved manner. Furthermore the curved underside 32 is embodied at least partially in a concave manner. The floating body 12 has a decreasing maximum transverse extension in the direction of the reference surface normal of the reference underside 60. The maximum transverse extension of the floating body 12 decreases by approximately 19 cm relative to the maximum transverse extension of the underside 32 of the floating body 12.

The floating body 12 further comprises four side walls 16, 18, which are embodied at least partially as slant surfaces. The side walls 16, 18 of the floating body 12 are embodied differently than the upper side 24 and the underside 32 of the floating body 12. The side walls 16, 18 connect the upper side 24 and the underside 32 of the floating body 12 to one another. The side walls 16, 18 have a curved surface. The side walls 16, 18 furthermore have a surface that is at least partially convexly curved. Main extension planes of the side wall 16, 18 form an angle of approximately 10 degrees relative to an allocated reference side face 62, 64 of the floating body 12. In an assembled operation state, the main extension planes of the side walls 16, 18 furthermore have an angle of approximately 80 degrees relative to the ideal water surface 82.

The four side walls 16, 18 of the floating body 12 are arranged at least substantially in a wedge-shaped fashion to each other. The side walls 16, 18 are embodied to be at least partially curved. Moreover a first main extension plane of a smallest imaginary rectangular cuboid enclosing a first one of the side walls 16, 18 has an angle offset of approximately 20 degrees relative to a second main extension plane of a smallest imaginary rectangular cuboid enclosing a second one of the side walls 16, 18. It is principally also conceivable for the angle offset to be realized smaller or greater. The angle offset may in particular be realized to be greater than 4 degrees and preferably smaller than 40 degrees.

The four side walls 16, 18 of the floating body 12 further comprise two different crimp profiles 30. The crimp profiles 30 are embodied integrally with the floating body 12. The crimp profiles 30 are integrally molded on the floating body 12. The crimp profiles 30 are implemented integrally molded with the floating body 12 by the extrusion blow procedure. Furthermore the crimp profiles 30 and the floating body 12 are formed from one blank. The crimp profiles 30 are furthermore embodied as deepenings. An arrangement of the crimp profiles 30 is effected on the side wall 16, 18 of the floating body 12. The first crimp profile 30 is implemented to be circulating perpendicularly to a longitudinal axis of the floating body 12. The first crimp profile 30 is realized on the upper side 24, on the underside 32 and on two side walls 16. The first crimp profile 30 is embodied as a groove-shaped deepening. The deepening of the first crimp profile 30 has a penetration depth in the floating body 12 that is analogous to the receiving region 20 and the further receiving region 22. The penetration depth is approximately 30 cm. Furthermore the second crimp profile 30 is embodied as a circle-shaped deepening on the further side wall 18. The second crimp profile 30 has a concave shape.

The crimp profiles 30 advantageously augment a stability of the floating body 12. The crimp profiles 30 are embodied differently than the stack element 26, 28. The crimp profile 30 also differs from the macroscopic anti-skid structure.

The floating body 12 further comprises at least one closure element 34 with a pressure compensation unit. The closure element 34 is configured for checking on the hollow space of the floating body 12. The closure element 34 is also configured for a filling and/or emptying of the floating body 12. The closure element 34 comprises a pressure compensation unit. The pressure compensation unit is configured to bring an inner pressure of the floating body 12 and an ambient pressure in line with each other. The pressure compensation unit is embodied as a pressure compensation valve. The pressure compensation unit is implemented such that it is impermeable for air in at least one operation state. The pressure compensation unit is furthermore implemented to be watertight. The pressure compensation valve is configured to bring an inner pressure of the floating body 12 in line with an ambient pressure. Alternatively or additionally the floating body 12 comprises a hole for a de-aeration of the hollow space delimited by the floating body 12, which is in particular not shown in the figures.

The carrier structure 14, 14a is configured for a transfer of support forces to a floating body 12 (see FIGS. 3 and 6). The carrier structure 14, 14a is, at least to a large extent, embodied of metal. Here the carrier structure 14, 14a is, at least to a large extent, embodied of steel. The carrier structure 14, 14a is implemented of carrier elements 36, 42, 44. The carrier elements 36, 42, 44 are connected to form the carrier structure 14, 14a. A large portion of the connections between the carrier elements 36, 42, 44 have connection means embodied as rivets. For a connection of carrier elements 36, 44, the connection means are partially embodied as screw connections.

The carrier structure 14, 14a further comprises at least one carrier element 36 that is embodied as a cable guiding unit. The cable guiding unit is implemented as a carrier element 36 that is delimited to three sides. Furthermore the cable guiding unit is embodied as a profiled semi-finished product. The cable guiding unit is also embodied as a combined L and Z profile. For an accommodation of cables the cable guiding unit is implemented such that it is bottomward closed. Beyond this the cable guiding unit has an edge protection element on open edges. The edge protection element is implemented as a bent element of a side wall of the carrier element 36. The edge protection element is configured to protect protruding cables from a cutting edge.

In an assembled operation state the carrier structure 14, 14a comprises seven carrier elements 42, 44, implemented by a hollow profile, in a horizontal plane (see FIG. 6). The hollow profiles are implemented of a semi-finished product. The hollow profiles have an at least substantially rectangular cross section. The carrier elements 42, 44 are furthermore embodied such that they are completely open along a longitudinal axis. An opening 38 along the longitudinal axis of the carrier element 42, 44 is implemented to be contiguously open. The opening 38 is implemented to be water-permeable.

In an assembled operation state the carrier element 36, 42, 44 has the opening 38 in a deepest point. In an assembled operation state the opening 38 is arranged in a deepest point. The opening 38 extends towards the ideal water surface 82 in a direction that is perpendicular to the ideal water surface 82. Furthermore the opening 38 extends downwards in an assembled operation state.

The carrier element 36, 42, 44 is in an assembled operation state arranged above the water surface 82. In an assembled operation state the opening 38 moreover extends in the direction of the earth acceleration.

The carrier element 42 is embodied as a C profile. The carrier element 42 with the C profile is configured, in an assembled operation state, to be received in the receiving region 20 of the side wall 16. The C profile is embodied as a profiled semi-finished product. Furthermore the C profile is embodied as a rectangular profile. The C profile is also embodied such that it is closed on three sides and has the contiguous opening 38 on one side along a longitudinal axis.

The second carrier element 44 is embodied as a hat profile. The hat profile comprises a three-side enclosure and has the opening 38 on an outer side, along a longitudinal axis.

Moreover the hat profile comprises webs along the longitudinal axis with the opening 38, said webs being canted outwards. The hat profile has an Omega-shaped cross section.

Further carrier elements 36 are embodied as Z profiles or as combined L and Z profiles.

Furthermore, in an assembled operation state, viewed in a direction from the upper side of the carrier element 42 to a water surface 82, the carrier element 42 having a C profile has at least one downward-extending slant surface 40. The slant surface 40 has an angle offset with respect to a surface of the carrier element 40 that is embodied parallel to the ideal water surface 82. The angle offset has a value of 7 degrees. The slant surface 40 is implemented in a planar fashion. The slant surface 40 of the carrier element 42 is moreover implemented to be at least partially correlating with the support surface of the floating body 12, in particular to an angle of the receiving contour.

For the purpose of a form-fit accommodation of two or four floating bodies 12, the carrier structure 14, 14a further comprises four carrier elements 42 that are embodied as longitudinal carrier elements and one carrier element 44 that is embodied as a transverse carrier element (see FIG. 8). The carrier structure 14, 14a further comprises two further carrier elements 44 embodied as transverse carrier elements which are configured, analogously to the one carrier element 44 embodied as a transverse carrier element, to transfer a support force to the floating bodies 12. The carrier elements 42 embodied as longitudinal carrier elements are in an assembled operation state arranged along a longitudinal side of the floating body 12. The two carrier elements 42 embodied as longitudinal carrier elements, which are arranged on the floating body 12 in pairs, are furthermore, in an assembled operation state, connected with an L-rail in an end region. The carrier elements 42 embodied as longitudinal carrier elements are arranged in the receiving regions 20 of the side walls 16. The carrier elements 44 embodied as transverse carrier elements are arranged on the upper side 24 of the floating body 12. The carrier element 44 embodied as a transverse carrier element is arranged in the further receiving region 22 of the upper side 24 of the floating body 12. The carrier elements 42 that are embodied as longitudinal carrier elements are implemented as C profiles. The carrier elements 44 that are embodied as transverse carrier elements are implemented as hat profiles. Respectively two carrier elements 42 embodied as longitudinal carrier elements and one carrier element 44 embodied as a transverse carrier element are section-wise configured to receive a floating body 12 in a form-fit manner. Herein the carrier elements 42 embodied as longitudinal carrier elements and the carrier elements 44 embodied as transverse carrier elements are implemented to be riveted with one another. The carrier elements 44 embodied as transverse carrier elements are arranged above the carrier elements 42 embodied as longitudinal carrier elements. On the carrier structure 14, which is configured to accommodate the energy conversion unit 52 with twelve solar elements 10 which are embodied as photovoltaic modules, respectively one rafter element is arranged above each of the three carrier elements 44 of the carrier structure 14 that are embodied as transverse carrier elements (see FIG. 7). The three rafter elements are implemented in a saddle roof shape. The rafter elements are furthermore implemented as closed hollow profiles. The rafter elements further comprise a screw connection with the carrier elements 44 that are embodied as transverse carrier elements. The rafter elements span a roof pitch angle of 12 degrees. It is generally conceivable that the rafter elements span a roof pitch angle in a range between 9 degrees and 16 degrees. On the upper side of the rafter elements, four purlin elements are implemented to be parallel to the carrier elements 42 embodied as longitudinal carrier elements. On one saddle roof side, respectively two differing purlin elements have rivet connections with the rafter elements. A first purlin element is embodied as a Z profile, a second purlin element is embodied as a cable guiding unit. The cable guiding unit is arranged closer to a roof ridge than the Z profile. Furthermore four wind bracing elements forming a wind bracing unit are configured for a reinforcement of the saddle roof structure. The wind bracing elements are arranged on an underside of the rafter elements. The wind bracing unit is implemented in an X-shape. The floating units 48a with an increased expected wind pressure comprise the wind bracing unit, in particular the increased expected wind pressure is situated in peripheral regions of the energy conversion system 6. A highest point of the purlin elements, in particular the roof ridge region, is arranged decentrally relative to the floating bodies 12, respectively to a longitudinal axis of the floating unit 48a. The carrier structure 14 is configured to accommodate the solar elements 10 in such a way that two of the four floating bodies 12 are overlapped by solar elements 10. The two other floating bodies 12 are free of an overlap by solar elements 10. The two other floating bodies 12 are furthermore implemented as a walkway. In a region between the two other floating bodies 12 and between the carrier elements 42 that are embodied as longitudinal carrier elements, two panels are arranged. The panels are configured to form a walkway. The panels are mounted above the carrier elements 42 that are embodied as longitudinal carrier elements.

The carrier structure 14a, which is configured to accommodate the power converter device 50, comprises four carrier elements 42 embodied as longitudinal carrier elements, wherein respectively two of the carrier elements 42 embodied as longitudinal carrier elements are configured to accommodate respectively one of the floating bodies 12 in a form-fit, floating fashion. The carrier elements 42 that are embodied as longitudinal carrier elements and are arranged in pairs are connected by means of three carrier elements 44 embodied as transverse carrier elements. Two U profiles are arranged parallel to the carrier elements 42 that are embodied as longitudinal carrier elements and below the carrier elements 44 that are embodied as transverse carrier elements, and are connected to the carrier elements 44 that are embodied as transverse carrier elements. The power converter device 50 is arranged on the carrier structure 14a, centrally between the two floating bodies 12. On the carrier structure 14a separate cable guiding units for AC and DC lines are arranged next to the power converter device 50. Furthermore gratings are arranged on the carrier structure 14a which form a walkway, in particular by the further alleyways 92.

The carrier structure 14, 14a is also configured to receive at least one floating body 12 such that it is supported in a floating fashion (see FIG. 8). The floating support of the floating body 12 in the carrier structure 14, 14a permits a movement range and/or expansion range of the floating body 12 that is delimited by the receiving region 20 and the further receiving region 22. The floating body 12 being received in the carrier structure 14, 14a is brought about without additional connection means. This especially advantageously allows doing without making use of fixation means entering the floating body 12. The receiving contours of the receiving region 20 and of the further receiving region 22 are configured for a centering receiving of the floating body 12. In an assembled operation state, the carrier elements 42 embodied as longitudinal carrier elements and the carrier elements 44 embodied as transverse carrier elements delimit an at least substantially perpendicular movement of the floating body 12 relative to the ideal water surface 82. Furthermore, in an assembled operation state, the carrier elements 42 embodied as longitudinal carrier elements and the carrier elements 44 embodied as transverse elements delimit an at least substantially parallel movement of the floating body 12 relative to the ideal water surface 82. In an assembled operation state, the carrier structure 14, 14a permits the floating body 12 a movement range and/or expansion range of 10 mm, along a direction oriented at least substantially perpendicularly to the water surface 82. The floating support of the floating body 12 in the carrier structure 14, 14a is configured for receiving and/or supporting the floating body 12 with a spacing of maximally 3 mm from the receiving region 20 and/or the further receiving region 22, in a vertical direction that is parallel to the reference surface normal of the reference side surface 62, 64.

The carrier structure 14 is furthermore implemented as a roof structure (see FIGS. 2 and 7). The roof structure comprises mounting surfaces which are configured to receive twelve solar elements 10. The roof structure is particularly preferably implemented for an accommodation of eighteen solar elements 10. The roof structure is furthermore embodied as a saddle roof structure. The purlin elements span the mounting surface together with the carrier elements 36. The solar elements 10 are arranged on an upper side of the purlin elements. The saddle roof structure is configured for an east-west orientation of the mounting surfaces.

Furthermore a solar device comprises the floating carrier device 8 with twelve solar elements 10. The solar device has a saddle roof structure configured to receive six solar elements 10 on each side of the saddle roof structure. In an assembled operation state respectively two directly neighboring solar elements 10, each of the two solar elements 10 being arranged on its own saddle roof side, form an air circulation opening 46 in a highest point. The air circulation opening 46 is arranged in a roof ridge region of the roof structure. The roof ridge region is implemented as an interruption-free continuous opening. The air circulation opening 46 is embodied as a spacing in the roof ridge region between directly neighboring solar elements 10 which are arranged facing away from one another. The spacing is 26 mm. The air circulation opening 46 between the spaced-apart solar elements 10 is completely free of structural components. The air circulation opening 46 is configured for conveying away a vertical air flow that is due to convection, preferably from the roof structure.

The energy conversion system 6 further comprises a connection device 66. The connection device 66 connects nine floating units 48a, which are embodied as a floating carrier device in a rigid manner to form a raft unit 68, and connects a plurality of raft units 68 to one another in a movable manner. It is also conceivable that the connection device 66 connects more or less than nine floating units 48a to one another to form a raft unit 68. It is further conceivable that the connection device 66 is configured to connect the floating units 48a to one another in a partly movable manner to form a raft unit 68.

The carrier elements 42 embodied as longitudinal carrier elements and the carrier elements 44 embodied as transverse carrier elements have a connection region on both front regions. The connection region is configured for an accommodation of a connection device 66. The connection region further comprises a fixation means receiving region for an accommodation of fixation means. The fixation means receiving region has two round openings on each front side.

The raft unit 68 is furthermore embodied as a 3×3 array with nine rigidly connected floating units 48a (see FIGS. 1a and 1b). It is moreover conceivable for the raft unit 68 to be implemented of more or less than nine floating units 48*a*. It is also conceivable for the floating units 48*a* to be connected to one another in a partly movable manner. The floating units 48*a* are arranged in a rectangle array.

Furthermore the raft units 68 are connected to each other in a completely movable manner by means of the connection device 66. It is also conceivable that the raft units 68 are connected to each other in a partly rigid manner by means of the connection device 66.

The connection device 66 partially has a connection with the carrier structure 14, 14*a*. In an assembled operation state the connection device 66 is arranged on the open front sides of the carrier elements 42 that are embodied as longitudinal carrier elements and of the carrier elements 44 that are embodied as transverse carrier elements. The connection device 66 is configured to be connected, partly via screw connections and partly via rivet connections, to the carrier elements 42 embodied as longitudinal carrier elements and to the carrier elements 44 embodied as transverse carrier elements.

In a pre-assembled state the connection device 66 comprises at least one connection unit that is embodied as a foldable connection unit. The connection device 66 is in the pre-assembled state configured to be connected, by one of two provided screw connections, to the connection region of the carrier element 42 that is embodied as a longitudinal carrier element or of the carrier element 44 that is embodied as a transverse carrier element. The carrier element 42 that is embodied as a longitudinal carrier element and the carrier element 44 that is embodied as a transverse carrier element each comprise respectively one receiving opening on their front sides, which is implemented to be correlating with a width of the connection device 66. In this way it is possible, in a pre-assembled state, for the connection device 66 to be folded on a partial circle around an axle of the one mounted screw connection. The receiving opening is configured to receive a longitudinal axle of the connection device 66 in an at least substantially perpendicular position. The foldable connection device 66 is configured to be folded from a pre-assembled state into an assembled operation state. Further a longitudinal axle of the foldable connection device 66 is folded from a position extending perpendicularly to the ideal water surface 82 into a position of an assembled operation state.

Beyond this the connection device 66 comprises at least one damper unit 70. In an assembled operation state the damper unit 70 is realized between the connection device 66 and a connection region of one of the carrier elements 42 embodied as longitudinal carrier elements or of the carrier elements 44 embodied as transverse carrier elements. The damper unit 70 is embodied as a spring-elastic element. The damper unit 70 is furthermore embodied as a macroscopic element. The damper unit 70 has at least one extension that is elastically modifiable by 10% in an assembled operation state. The damper unit 70 furthermore generates a counter-force acting counter to the modification, which is dependent on the modification of the extension, and is preferably proportional to the modification. The damper unit 70 further comprises a rubber damper element. The damper unit 70 has a rectangle geometry.

The connection device 66 further comprises a movable connection unit 72 (see FIG. 9). In an assembled operation state the movable connection unit 72 comprises two connection elements 74, 76, which are connected with each other in a pivotable manner. The connection elements 74, 76 share a pivot axis. The pivot axis is implemented by a threaded bolt. The bolt is furthermore embodied as a plug bolt. The connection elements 74, 76 further comprise respectively two pass-through openings for connection means. The connection means is embodied as a plug bolt having a securing element.

Beyond this the connection device 66 comprises a hollow profile. The hollow profile of the connection device 66 has, in at least one front region, a reduced cross section, in particular relative to the cross section of the hollow profile. In a pre-assembled state of the connection device 66, the reduced cross section in the front region is configured for folding off, without resistance, at least one portion of the connection device 66 into the corresponding receiving opening on the carrier element 42 that is embodied as a longitudinal carrier element or on the carrier element 44 that is embodied as a transverse carrier element. Starting from the front region of the hollow profile, the reduced cross section has an at least substantially wedge-shaped profile, which is implemented with a step in a longitudinal direction of the hollow profile. Furthermore end regions of the wedge-shaped profile are embodied in a rounded manner.

The first connection element 74 is implemented as a rectangular hollow profile with a support opening along a longitudinal axis. The hollow profile is implemented in a square shape with an edge length of 40 mm×40 mm. The support opening is configured to movably receive the second connection element 76. The support opening is realized as a recess along a longitudinal axis of the hollow profile. The recess extends through two side faces of the hollow profile which extend at least substantially parallel to each other. The first connection element 74 and the second connection element 76 are configured to be received on the open front region of the carrier element 42 that is embodied as a longitudinal carrier element or of the carrier element 44 that is embodied as a transverse carrier element. The second connection element 76 is realized as a combination of a flat material and a hollow profile. The hollow profiles of the first and second connection elements 74, 76 each have respectively two pass-through openings in the connection regions, for the purpose of receiving connection means. The connection means are embodied as plug bolts respectively having a securing element. The flat material is implemented such that it is welded with the one hollow profile of the second connection element 76. In an assembled operation state the flat material of the second connection element 76 is configured such that it is received in the receiving opening of the first connection element 74 and is movable around the shared pivot axis. The flat material of the second connection element 76 has a radius in a front region. The radius is configured such that the second connection element 76 is implemented to be pivotable without resistance in the receiving opening of the first connection element 74. In an assembled operation state the movable connection unit 72 is configured to permit a pivot movement in a plane that is perpendicular to the ideal water surface 82. It is furthermore possible for the movable connection unit 72 to be implemented in such a way that it is movably supported in the connection region via the connection means.

Further a rigid connection unit 78 is implemented by a hollow profile (see FIG. 10). The hollow profile has the measurements 40 mm×40 mm. The rigid connection unit 78 comprises in total four pass-through openings for connection means. It is also conceivable that the rigid connection unit 78 comprises a plurality of pass-through openings. The connection means are embodied as plug bolts having a securing element. The hollow profile of the rigid connection unit 78 has a reduced cross section in both front regions. The reduced cross section is realized perpendicularly to the longitudinal axis of the rigid connection unit 78. Starting from the front region of the hollow profile, the reduced cross section has an at least substantially wedge-shaped profile, which is implemented with a step in the longitudinal direction of the hollow profile. Furthermore the end regions of the hollow profile are embodied in a rounded manner.

Furthermore the connection device 66, with the exception of the damper unit 70, is embodied entirely of steel.

Beyond this, from a length of approximately 130 m, an array of raft units 68 is encompassed by a wave-breaker device 80 of the energy conversion system 6 (see also FIG. 11). The wave-breaker device 80 is implemented as a plurality of floating bodies 12, which are connected via longitudinal carrier elements 42 and movable connection units 72. In an assembled operation state, as part of the wave-breaker device 80, the floating bodies 12 have water as ballast inside their hollow spaces. The wave-breaker device 80 further comprises a movable connection with the raft units 68. In an assembled operation state the wave-breaker device 80 is connected to the raft units 68 of the energy conversion system 6 by way of movable connection units 72 (see FIG. 1). It is conceivable for the energy conversion system 6, in particular the floating carrier devices 8, 9 and/or the floating units 48a, 48b, to comprise at least one bird-deterrent unit that is configured to prevent birds from nesting and/or from stopping on the energy conversion system 6. In particular, the bird-deterrent unit is not shown in the figures. The bird-deterrent unit comprises, for example, a plurality of wires, barbs and/or projections, which are arranged on surfaces of the energy conversion system 6, in particular of the floating carrier units 8, 9 and/or of the floating units 48a, 48b. It is also conceivable that the bird-deterrent unit is arranged at least partially on the wave-breaker device 80.

The arrangement of the energy conversion system 6 moreover comprises, following a sequence of twelve row-wise adjacent floating carrier devices 8 loaded with solar elements 10, a further floating carrier device 9 with the power converter device 50, followed by another sequence of twelve row-wise adjacent floating carrier devices 8 loaded with solar elements 10 (see FIG. 2). The floating carrier devices 9 with the respectively one power converter device 50 form, in particular by the further alleyways 92, a walkway that is perpendicular to the walkways, which are in particular formed by the alleyways 88, of the floating carrier devices 8 with the solar elements 10.

FIG. 11 shows a portion of an energy conversion system 122 with a stabilization device 116. The stabilization device 116 is arranged on a floating unit 118 of the energy conversion system 122 below an, in particular ideal, water surface 82 of the water body. The stabilization device 116 is configured to apply, at least onto the floating unit 118, a counterforce to a movement of the floating unit 118 relative to the water surface 82 wherein, in at least one operation state, the stabilization device 116 has a greater maximum distance 120 from the, in particular ideal, water surface 82 than the floating unit 118, in particular than a floating body 102 of the floating unit 118. The floating unit 118 comprises in particular three floating bodies 102, which are connected to each other via a carrier structure 104 of the energy conversion system 122. The stabilization device 116 is fixated, in particular at least substantially non-releasably, in particular via a rivet connection, on a floating body 102 of the floating unit 118, on the connection device 66 and/or on the carrier structure 104 of the energy conversion system 122. It is also conceivable that the stabilization device 116 is fixated on the floating body 102 of the floating unit 118, on the connection device 66 and/or on the carrier structure 104 via a screw connection or the like.

The stabilization device 116 comprises a plurality of, in particular four, stabilization elements 124 for a cooperation with a fluid of the water body, and comprises at least one bracing unit 126 for an, in particular at least substantially tolerance-free, arrangement of the stabilization elements 124. The stabilization elements 124 are arranged on an underside of the energy conversion system 122, in particular of the floating unit 118. In particular in a floating state of the energy conversion system 122, in particular of the floating unit 118, the stabilization elements 124 are arranged below the water surface 82. The bracing unit 126 comprises a plurality of bracing elements 128, which connect the stabilization elements 124 with the floating body 102 of the floating unit 118, with the connection device 66 and/or with the carrier structure 104. The stabilization elements 124 are arranged at least substantially parallel to the, in particular ideal, water surface 82. In particular, a main extension axis of the stabilization elements 124 extends at least substantially parallel to the, in particular ideal, water surface 82. The stabilization device 116 comprises two further stabilization elements 130, which are respectively arranged on the bracing elements 128. In particular, the further stabilization elements 130 extend between two bracing elements 128 of the bracing unit 126, which in particular extend at least substantially perpendicularly to the water surface 82.

The stabilization device 116, in particular the stabilization elements 124, comprises/comprise force transfer areas 132 for a cooperation with a fluid of the water body which, in particular in at least one operation state, are arranged, at least to a large extent, at least substantially parallel to an ideal water surface 82.

The stabilization device 116, in particular the further stabilization elements 130, comprises transverse force transfer areas 134 for a cooperation with a fluid of the water body which, in particular in at least one operation state, are arranged, at least to a large extent, at least substantially perpendicularly to an ideal water surface 82. The stabilization elements 124 form the force transfer areas 132. The further stabilization elements 130 form the transverse force transfer areas 134. The stabilization elements 124 are each embodied at least substantially panel-shaped. The further stabilization elements 130 are each embodied at least substantially panel-shaped. The stabilization elements 124 respectively form two force transfer areas 132, which are arranged on sides of the respective stabilization element 124 that face away from each other. The further stabilization elements 130 respectively form two transverse force transfer areas 134, which are arranged on sides of the respective further stabilization element 130 that face away from each other. The force transfer areas 132 and/or the transverse force transfer areas 134 are respectively embodied having at least largely planar surfaces. One of the stabilization elements 124 is arranged, in particular viewed along a direction that is oriented at least substantially perpendicularly to the water surface 82, between the two further stabilization elements 130 and/or between the bracing elements 128. Two other stabilization elements 124 are respectively arranged on one of the further stabilization elements 130 and/or on two of the bracing elements 128. The two other stabilization elements 124 in particular form projections respectively extending away from the bracing unit 126, in particular the bracing elements 128. The stabilization elements 124 are embodied as panels, which are connected to one another via a strut system and are fixated on the bracing elements 128. The bracing elements 128 of the bracing unit 126 are embodied as rod-shaped struts, which in particular the stabilization elements 124 and the further stabilization elements 130 are fixated to. Preferentially the stabilization elements 124 and/or the further stabilization elements 130 are fixated on the carrier structure 104 of the floating unit 118 by means of the bracing unit 126, in particular the bracing elements 128. The bracing unit 126 comprises, in particular four, further bracing elements 136, which in particular support the bracing elements 128 against a movement towards each other, in a direction that is oriented at least substantially parallel to the water surface 82. The further bracing elements 136 are arranged respectively cross-wise with another further bracing element 136. In particular, respectively two of the bracing elements 128 are implemented integrally with one of the further stabilization elements 130. It is however also conceivable that the bracing elements 128 and the further stabilization elements 130 are implemented separately and/or are arranged, in particular fixated, to each other. Preferably the cross-wise arranged further bracing elements 136 are fixated to each other and/or supported rotatably to each other in a contact region, in particular a middle region that is arranged around a geometrical center of the further bracing element 136. Preferentially each of the further bracing elements 136 is arranged with one end on one of the bracing elements 128. It is however also conceivable that the further bracing elements 136 are arranged with one end on the carrier structure 104. It is also conceivable for the stabilization device 116, in particular the bracing unit 126, to be arranged, in particular fixated, on a wave-breaker device 80 of the energy conversion system 122, which is in particular arranged on the floating unit 118 and/or on the carrier structure 104. However, other implementations of the stabilization device 116, in particular of the stabilization elements 124, the further stabilization elements 130 and/or the bracing unit 126, are also conceivable.

In at least one operation state the stabilization device 116 has in a perpendicular direction a maximum distance 138 from the floating unit 118 that is at least 50 cm, preferably at least 100 cm, preferentially at least 150 cm and particularly preferably at least 180 cm. In particular, the maximum distance 138 of the stabilization device 116, in particular the stabilization elements 124, from the floating unit 118 is maximally 400 cm, preferably no more than 300 cm and preferentially no more than 250 cm. The maximum distance 138 of the stabilization device 116, in particular the stabilization elements 124, from the floating unit 118 extends at least substantially perpendicularly to the ideal water surface 82. In particular, a minimum distance 140 of the stabilization device 116, in particular the stabilization elements 124, from the floating unit 118, in particular from an underside and/or a bottom of the floating unit 118, in particular from a floating body 102 of the floating unit 118, is at least 40 cm, preferably at least 80 cm, preferably at least 120 cm and particularly preferably at least 160 cm. The bracing elements 128 of the bracing unit 126, in particular at least one of the bracing elements 128 of the bracing unit 126, preferably have/has a maximum longitudinal extension 142 of at least 150 cm, preferably at least 170 cm and especially preferentially at least 190 cm. The bracing elements 128 of the bracing unit 126 are preferably arranged, in particular fixated, with one end on the connection device 66 and/or on the carrier structure 104. The bracing elements 128 of the bracing unit 126 are preferably arranged, in particular fixated, with another end that faces away from the one end, on one of the stabilization elements 124.

The force transfer areas 132, in particular a total of all force transfer areas 132 of the stabilization elements 124, are at least 2,500 cm², preferably at least 5,000 cm², preferentially at least 7,500 cm² and especially preferentially at least 10.000 cm². The transverse force transfer areas 134, in particular a total of all transverse force transfer areas 134 of the further stabilization elements 130, are at least 1,000 cm², preferentially at least 2,000 cm² and preferably at least 3,000 cm². In particular, the force transfer areas 132, in particular the total of all force transfer areas 132 of the stabilization elements 124, are maximally 30,000 cm², preferentially no more than 25,000 cm² and preferably maximally 20,000 cm². Main extension planes of the individual force transfer areas 132 respectively extend at least substantially parallel to the ideal water surface 82. In particular, the stabilization elements 124 each comprise a further force transfer area 132, which is in particular arranged on a side of the stabilization element 124 that faces away from a force transfer area 132. Particularly preferably the force transfer area 132 is arranged on a side of the stabilization device 116, in particular the stabilization element 124, that faces towards the ideal water surface 82. Preferably the further force transfer area 132 is arranged on a side of the stabilization device 116, in particular the stabilization element 124, that faces away from the ideal water surface 82. Preferentially the force transfer area 132 and the further force transfer area 132 are embodied to be congruent. It is however also conceivable that the force transfer area 132 and the further force transfer area 132 are embodied differently. A main extension plane of the further force transfer area 132 preferentially extends at least substantially parallel to the ideal water surface 82.

It is conceivable for the stabilization device 116 to comprise a plurality of stabilization elements 124, which in particular together form a force transfer area 132 and a further force transfer area 132. A size of the force transfer area 132 and/or the further force transfer area 132 is implemented to be adjustable, in particular by a modular removal or addition of individual stabilization elements 124. For example, the counterforce acting onto the floating unit 118 may be adapted via the force transfer areas 132 in an application-specific and/or environment-specific manner, depending on a weight of the energy conversion system 122, in particular of the floating unit 118, and/or on a swell/on wind waves of the water body.

In FIGS. 12a, 12b and 12c an alternative implementation of a floating body 102 of a floating carrier device 100 and/or of a floating unit 118 is illustrated. As the floating body 102 shown in FIGS. 12a, 12b and 12c has an at least substantially analogous implementation to the floating bodies 12 described in the description of FIGS. 1 to 10, the description of FIGS. 1 to 10 may at least substantially be referred to regarding an implementation of the floating body 102 shown in FIGS. 12a, 12b and 12c. Differently than the floating bodies 12 described in the description of FIGS. 1 to 10, the floating body 102 shown in FIGS. 12a, 12b and 12c preferably has a maximum longitudinal extension 144 of more than 180 cm, preferentially more than 200 cm, preferably more than 220 cm and particularly preferably at least substantially 224 cm. In particular, the maximum longitudinal extension 144 of the floating body 102 extends at least substantially parallel to a main extension axis 146 of the floating body 102, said main extension axis 146 being oriented, in particular in a state when arranged on the water body, at least substantially parallel to the ideal water surface 82. A maximum transverse extension 148 of the floating body 102 is preferably implemented identically to a maximum transverse extension of the floating body 12 described in FIGS. 1 to 10. The maximum transverse extension 148 of the floating body 102 preferably is at least 50 cm, preferentially at least 55 cm, preferably at least 60 cm and very particularly preferably at least substantially 60 cm. In particular, the maximum transverse extension 148 of the floating body 102 is oriented at least substantially perpendicularly to the maximum longitudinal extension 144 of the floating body 102 and is, in particular in a state when arranged on the water body, oriented at least substantially parallel to the ideal water surface 82. The floating body 102 delimits a hollow space 150, in particular precisely one hollow space 150, which has a maximum volume of more than 400 liters, preferably more than 500 liters, preferentially more than 700 liters, particularly preferably more than 720 liters and very preferentially at least substantially 730 liters. Preferably the maximum volume of the hollow space 150 of the floating body 102 is realized by precisely one recess that is delimited by the floating body 102. The floating body 102 preferentially has a maximum outer surface 152 comprising in particular receiving regions 20, 22, stack elements 26, 28, side walls 16, 18 and/or crimp profiles 30 of the floating body 102 (see also FIGS. 5a, 5b and 5c). In particular, the maximum outer surface 152 of the floating body 102 is at least 3 m$^2$, preferentially at least 5 m$^2$ and preferably at least 6 m$^2$. Preferentially the floating body 102 has a maximum weight of no more than 50 kg, preferably no more than 35 kg, preferentially no more than 32 kg, particularly preferably no more than 30 kg and very particularly preferably no more than 25 kg. In particular, the maximum weight of the floating body 102 is at least 10 kg, preferentially at least 15 kg and preferably at least 20 kg. The floating body 102 preferentially has an average wall thickness 154 of at least 4 mm, preferentially at least 5 mm and especially preferentially at least 5.5 mm. Preferably the average wall thickness 154 of the floating body 102 is maximally 10 mm, preferentially maximally 9 mm and preferably no more than 7 cm. It is conceivable that, at least in a region of the receiving regions 20, 22, the floating body 102 has at least partly a greater wall thickness than in regions that differ from the receiving regions 20, 22.

The floating body 102 comprises on an upper side of the floating body 102 three receiving regions 22, 158 for the carrier structure 104, in particular for the purpose of receiving the carrier structure 104 at least partly. The three receiving regions 22, 158 extend at least substantially completely over the maximum transverse extension 148 of the floating body 102. Viewed along the maximum longitudinal extension 144 and/or the main extension axis 146 of the floating body 102, one receiving region 22 of the three receiving regions 22, 158 is arranged centrally on the floating body 102. The receiving region 22 of the three receiving regions 22, 158 is shown in particular in FIG. 12c in a cross section. In particular, the receiving region 22 is configured to receive a transverse carrier element 44 of the carrier structure 104 at least in a form-fit manner, wherein in particular the transverse carrier element 44 of the carrier structure 104 adjoins the floating body 102, in particular in an assembled state. It is also conceivable that the receiving region 22 is configured for receiving a carrier element 36 or a bracing element 108 of the carrier structure 104. The floating body 102 preferentially forms a projection 156 within the receiving region 22 of the three receiving regions 22, 158, wherein in particular the carrier element 36 and/or the bracing element 108 of the carrier structure 104 are/is configured, when the carrier structure 104 is supported on the floating body 102, to receive the projection 156 at least partly, in particular at least to a large extent. Preferentially the projection 156 and the transverse carrier element 44, the carrier element 36 or the bracing element 108 of the carrier structure 104 is configured for a holding and/or securing of the carrier structure 104 against a movement of the floating body 102 and/or of the carrier structure 104 in a direction that is oriented at least substantially parallel to the maximum longitudinal extension 144 and/or to the main extension axis 146 of the floating body 102. Viewed along the maximum longitudinal extension 144 and/or the main extension axis 146 of the floating body 102, two receiving regions 158 of the three receiving regions 22, 158 are arranged each on one end of the floating body 102 respectively. In particular, the two receiving regions 158 of the three receiving regions 22, 158 are arranged on two ends of the floating body 102 that face away from each other. The two receiving regions 158 of the three receiving regions 22, 158 are in particular configured to receive two transverse carrier elements 44, two carrier elements 36 or two bracing elements 108 of the carrier structure 104. The two receiving regions 108 of the three receiving regions 22, 158 and/or the two transverse carrier elements 44, the two carrier elements 36 or the two bracing elements 108 of the carrier structure 104 are preferably configured for tensioning the floating body 102 on the carrier structure 104 in a direction that is oriented at least substantially parallel to the maximum longitudinal extension 144 and/or to the main extension axis 146 of the floating body 102, and/or for securing and/or holding the floating body 102 against a movement relative to the carrier structure 104 in the direction that is oriented at least substantially parallel to the maximum longitudinal extension 144 and/or to the main extension axis 146 of the floating body 102. The floating body 102 comprises two further receiving regions 20, which are respectively arranged on a side wall 16, 18 of the floating body 102. The two further receiving regions 20 extend at least substantially parallel to the maximum longitudinal extension 144 and/or the main extension axis 146 of the floating body 102. The two further receiving regions 20 are configured to at least partly receive the carrier structure 104, in particular a carrier element 36 and/or a bracing element 108 of the carrier structure 104. Preferentially a minimum distance 160 of the two further receiving regions 20 from an underside 32 of the floating body 102 extends by at least 30 cm, preferably at least 35 cm and particularly preferably at least 40 cm. The two further receiving regions 20 are preferably configured, by way of a cooperation with the carrier structure 104, for a holding and/or securing of the floating body 102 against a movement relative to the carrier structure 104 in a direction that is oriented at least substantially perpendicularly to the maximum longitudinal extension 144 and/or to the main extension axis 146 of the floating body 102. Preferentially the two further receiving regions 20 are delimited in a direction towards an upper side 24 of the floating body 102 at least partly, in particular at least to a large extent, by a wall of the floating body 102. Preferentially the two further receiving regions 20 are configured for a holding and/or securing of the floating body 102, via cooperation with the carrier structure 104, against a movement relative to the carrier structure 104 in a direction that is oriented from the underside 32 of the floating body 102 to the upper side 24 of the floating body 102. However, implementations of the floating body 102, having on the upper side 24 a number of receiving regions 22, 158 that differs from three, are also conceivable, for example only having a receiving region 22 that is arranged centrally on the upper side 24 of the floating body 24.

FIG. 13 shows an alternative implementation of a solar device 98, comprising a floating carrier device 100 and a plurality of, in particular eighteen, solar elements 10. The floating carrier device 100 comprises four floating bodies 102, which in particular respectively correspond to the floating body 102 described regarding FIGS. 12a, 12b and 12c. The floating carrier device 100 comprises a carrier structure 104, which is coupled with the floating bodies 102 and which is in particular configured for a support of the solar elements 10 on the floating bodies 102. Alternatively it is conceivable that the floating carrier device 100 comprises a number of floating bodies 102 that differs from four, preferably at least three. Alternatively or additionally it is conceivable that the floating carrier device 100 is configured to receive a number of solar elements 10 differing from eighteen. The floating carrier device 100 depicted in FIG. 13 has an implementation that is at least substantially analogous to the floating carrier device 8 described in the description of FIGS. 1 to 10, and therefore the description of FIGS. 1 to 10 may at least substantially be referred to in regard to an implementation of the floating carrier device 100 shown in FIG. 13. Differently than the floating carrier device 8 described in the description of FIGS. 1 to 10, the floating carrier device 100, in particular the carrier structure 104, shown in FIG. 13 preferably has a greater maximum longitudinal extension 162, 170. In particular, the maximum longitudinal extension 162, 170 of the floating carrier device 100, in particular of the carrier structure 104, is oriented at least substantially parallel to a main extension axis 164 of the floating carrier device 100, in particular the carrier structure 104, which is in particular oriented at least substantially parallel to an ideal water surface 82.

The solar elements 10, in particular in an arrangement on the floating carrier device 100, together have a maximum longitudinal extension 166 of at least 4 m, preferably at least 6 m, preferentially at least 8 m and particularly preferably at least 9 m. Preferably, in an assembled state of the solar device 98 and/or in a state of the solar elements 10 being arranged on the carrier structure 104, the maximum longitudinal extension 166 of the solar elements 10 is oriented at least substantially parallel to the maximum longitudinal extension 170 of the carrier structure 104, in particular of a bracing element 136 of the carrier structure 104, and/or oriented parallel to the floating carrier device 100, in particular to the main extension axis 164 of the floating carrier device 100. In a state when arranged on the carrier structure 104, the solar elements 10 are preferably arranged along the maximum longitudinal extension 166 of the solar elements 10 in two rows 168, which are in particular arranged at least substantially parallel to one another. Especially preferentially the maximum longitudinal extension 166 of the solar elements 10 is to be understood as a maximum longitudinal extension 166 of all solar elements 10 of the solar device 98 in a state when arranged on the carrier structure 104, and is in particular realized differently from a maximum longitudinal extension of the individual solar elements 10. Preferably, in the assembled state of the solar device 98 and/or in the state when the solar elements 10 are arranged on the carrier structure 104, the carrier structure 104, in particular the at least one bracing element 136, extends over the maximum longitudinal extension 166 of the solar elements 10 at least to a large extent, in particular at least substantially completely, wherein in particular the solar elements 10, in particular a row 168 of the solar elements 10, are/is arranged, in particular fixated, on the bracing element 136.

The carrier structure 104 has a maximum longitudinal extension 170 of at least 4 m, preferentially at least 6 m, preferably at least 8 m and particularly preferably at least 9 m. Preferably the maximum longitudinal extension 170 of the carrier structure 104 is at least substantially parallel to the main extension axis 164 of the floating carrier device 100, in particular of the carrier structure 104, and/or the maximum longitudinal extension 170 of the carrier structure 104 is oriented at least substantially parallel to the ideal water surface 82, in particular in a floating state of the floating carrier device 100. Preferably, viewed in at least one plane, in particular a plane that is oriented at least substantially parallel to a main extension plane of the floating carrier device 100, in particular of the carrier structure 104, and/or oriented, in particular in a floating state of the floating carrier device 100, at least substantially parallel to the ideal water surface 82, the floating carrier device 100, in particular the carrier structure 104, has an at least substantially rectangular basic shape, wherein in particular the maximum longitudinal extension 170 of the carrier structure 104 extends along a longest side of the basic shape. In particular, the maximum longitudinal extension 170 of the carrier structure 104 is maximally 20 m, preferentially maximally 15 m and preferably no more than 10 m. The maximum longitudinal extension 170 of the carrier structure 104 preferentially extends at least to a large extent, in particular at least substantially completely, over a maximum longitudinal extension 162 of the floating carrier device 100. The carrier structure 104 has a maximum transverse extension 172 of at least 3 m, preferably at least 4 m and preferentially at least 4.5 m. The maximum transverse extension 172 of the carrier structure 104 is preferably oriented at least substantially parallel to the main extension plane of the floating carrier device 100, in particular of the carrier structure 104, and/or is oriented at least substantially parallel to the ideal water surface 82, in particular in a floating state of the floating carrier device 100. In particular, the maximum transverse extension 172 of the carrier structure 104 is oriented at least substantially perpendicularly to the maximum longitudinal extension 170 of the carrier structure 104. Preferentially, viewed in at least one plane, in particular in a plane that is oriented at least substantially parallel to the main extension plane of the floating carrier device 100, in particular of the carrier structure 104, and/or is oriented, in particular in a floating state of the floating carrier device 100, at least substantially parallel to the ideal water surface 82, the floating carrier device 100, in particular the carrier structure 104, has an at least substantially rectangular basic shape, wherein in particular the maximum transverse extension 172 of the carrier structure 104 extends along a side of the basis shape that is in particular implemented differently from the longest side of the basic shape. In particular, the maximum transverse extension 172 of the carrier structure 104 is maximally 20 m, preferably maximally 15 m and preferentially maximally 10 m. Preferably the maximum transverse extension 172 of the carrier structure 104 extends at least to a large extent, in particular at least substantially completely, over a maximum transverse extension of the floating carrier device 100.

The carrier structure 104 comprises four bracing elements 136, which are configured for a support of the plurality of solar elements 10 along the maximum longitudinal extension 170 of the carrier structure 104, wherein the bracing elements 136 each have a maximum longitudinal extension 174 of at least 4 m, preferably at least 6 m, preferentially at least 8 m and particularly preferably at least 9 m. Preferably the bracing elements 136, in particular the maximum longitudinal extension 174 of the bracing elements 136, extend at least substantially parallel to the maximum longitudinal extension 170 of the carrier structure 104. In particular, the bracing elements 136 are respectively embodied as a strut with a hollow profile and with an opening that extends along the maximum longitudinal extension 174 of the bracing elements 136 and is in particular located on an underside of the respective bracing element 136. However, other implementations of the bracing elements 136 are also conceivable, for example as rails, as beams, as bars, or the like. It is conceivable that, in particular viewed in a section plane that is oriented at least substantially perpendicularly to the maximum longitudinal extension 174 of the bracing elements 136, the bracing elements 136 are embodied structurally identical and/or identical to a carrier element 36, in particular to the carrier elements 36 of the carrier structure 14 shown in FIGS. 1 to 10. It is in particular conceivable that the bracing elements 136 are respectively embodied as a C profile, that they are embodied at least partially open when viewed along the maximum longitudinal extension 174 of the bracing elements 136, and/or that in an assembled operation state, when viewed in a direction from an upper side of the bracing elements 136 towards the water surface 82, they have at least one downwards-extending slant surface. In particular, the bracing elements 136, in particular the maximum longitudinal extension 174 of the bracing elements 136, extend/extends at least largely, in particular at least substantially completely, over the maximum longitudinal extension(s) 170, 162 of the carrier structure 104 and/or of the floating carrier device 100. In particular, for the purpose of supporting the solar elements 10 over a large portion of the maximum longitudinal extension 170, 174 of the carrier structure 104 and/or of the bracing elements 136, in particular over the at least substantially complete maximum longitudinal extension 170, 174 of the carrier structure 104 and/or of the bracing elements 136, the carrier structure 104, in particular the bracing elements 136, is/are configured to receive solar elements 10. Other implementations of the carrier structure 104 are also conceivable, for example with a number of bracing elements 136 differing from four. The bracing elements 136 are preferably each embodied to be hollow and/or they delimit at least one recess, preferentially along their maximum longitudinal extension 174. In particular, the bracing elements 136 are configured for guiding cables to the solar elements 10 and/or away from the solar elements 10, in particular within or in the recess. Preferentially cables of the solar elements 10, of a power converter device 50 and/or of an external unit are arranged at least partially along the maximum longitudinal extension 174 of the bracing elements 136 on and/or within at least one of the bracing elements 136. It is conceivable that the cables are fixated on the bracing element(s) 136 via at least one fixation means, e.g. a clamp, a loop, a screw connection or the like.

FIG. 14 shows a further alternative implementation of a floating carrier device 106. A carrier structure 176 of the floating carrier device 106 is configured to transfer a support force of a power converter device 50 to two floating bodies 102 of the floating carrier device 106. It is also conceivable that the carrier structure 176 is configured to transfer a support force of a functional device that is implemented differently than the power converter device 50 to the floating bodies 102, the functional device being embodied, for example, as a connection hub for a bundling of a plurality of solar devices and/or solar boats, in particular of supply and/or transmission cables of a plurality of solar devices and/or solar boats, and/or being embodied as a monitoring device for a monitoring of solar boats and/or solar devices which are connected with the functional device and/or surround the functional device (see FIG. 1). The floating carrier device 106 illustrated in FIG. 14 has an implementation at least substantially analogous to the floating carrier device 9 described in the description of FIG. 3, and therefore the description of FIG. 3 may be at least substantially referred to as regards an implementation of the floating carrier device 106 shown in FIG. 14. Differently than the floating carrier device 9 described in the description of FIG. 3, the floating carrier device 106 illustrated in FIG. 14 is preferably configured to realize the power converter device 50 in such a way that it is at least substantially completely walkable in a circulating fashion. The floating carrier device 106 comprises six bottom elements 178, which are arranged at least substantially parallel to a maximum longitudinal extension 180 of the floating carrier device 106 and which lie upon the carrier structure 176. In particular, a respective longitudinal axis of the bottom elements 178 is arranged at least substantially parallel to the maximum longitudinal extension 180 of the floating carrier device 106. Respectively three bottom elements 178 of the six bottom elements 178 form a further alleyway 92, which extends at least substantially parallel to a maximum longitudinal extension 180 of the floating carrier device 106. The two further alleyways 92 are respectively arranged on the carrier structure 176 on sides of the power converter device 50 that face away from each other. It is however also conceivable that the floating carrier device 106 comprises a number of bottom elements 178 that differs from six, the bottom elements 178 being in particular arranged at least substantially perpendicularly to the maximum longitudinal extension 180 of the floating carrier device 106. The floating carrier device 106 comprises two cable channel elements 182, which are arranged at least substantially parallel to the bottom elements 178 and/or to the maximum longitudinal extension 180 of the floating carrier device 106. In particular, a respective longitudinal axis of the cable channel elements 182 is arranged at least substantially parallel to the maximum longitudinal extension 180 of the floating carrier device 106 and/or to the bottom elements 178. In particular, the cable channel elements 182 are respectively embodied as an at least substantially panel-shaped bottom element delimiting at least one recess (not shown in the figures) for a guiding of cables. Other implementations of the cable channel elements 182 are also conceivable. In particular, the cable channel elements 182 are embodied, on a respective upper side 184 of the cable channel elements 182, in an anti-skid fashion. Preferentially the cable channel elements 182 are configured for guiding cables of a solar device from at least one solar element 10 to the power converter device 50 and/or from the power converter device 50 to an external unit (not shown in the figures), for example a transformer. The bottom elements 178 and the cable channel elements 182 together form a walkable surface, which is in particular realized at least substantially completely around the power converter device 50. In particular, the power converter device 50 is implemented in such a way that it is completely walkable in a circulating fashion via the bottom elements 178 and the cable channel elements 182. However, other implementations of the floating carrier device 106 are conceivable, for example with a number of cable channel elements 182 that differs from two. The bottom elements 178 and/or the cable channel elements 182 cover the floating bodies 102 of the floating carrier device 106, in particular upper sides of the floating bodies 102 of the floating carrier device 106, at least to a large extent, in particular at least substantially completely. The power converter device 50 is preferentially arranged between the two cable channel elements 182 and/or between the two further alleyways 92. In particular, the two further alleyways 92 have a maximum transverse extension 94 of at least 80 cm, preferably at least 90 cm and preferentially at least 100 cm. Preferably the two further alleyways 92, in particular a maximum longitudinal extension of the two further alleyways 92 on the floating carrier device 106, respectively extend at least substantially completely over a maximum longitudinal extension 180 of the floating carrier device 106. The bottom elements 178 and/or the cable channel elements 182 preferentially lie upon the carrier structure 176, in particular upon carrier elements 186 of the carrier structure 176. Preferably the bottom elements 178 and/or the cable channel elements 182 are fixated on the carrier structure 176, in particular on the carrier elements 186.

Preferentially the bottom elements 178 delimit a plurality of pass-throughs, in particular in a manner distributed over a main extension plane of the bottom elements 178. In a state when the bottom elements 178 are fixated, in particular mounted, on the carrier structure 176, the pass-throughs extend from an upper side of the bottom elements 178 over an entire height of the bottom elements 178 to an underside of the bottom elements 178. The pass-throughs are preferably configured for conveying water from the upper side of the bottom elements 178 through the bottom elements 178 in a perpendicular direction. Preferentially the pass-throughs are configured to at least substantially prevent a retention of water on the bottom elements 178. Preferably the bottom elements 178 are embodied, in particular on an upper side of the bottom elements 178, at least partly in an anti-skid fashion. In a preferred implementation the bottom elements 178 form edgings delimiting the pass-throughs (not shown in the figures), which have an anti-skid effect. For example, the pass-throughs are embodied to be round or angular. Preferentially the pass-throughs and/or the edgings of one bottom element 178 feature several different implementations. The bottom elements 178 are preferably embodied of aluminum or of, in particular furrowed or perforated, sheet metal. However, other implementations of the bottom elements 178 are also conceivable.

The carrier structure 176 comprises two fixation elements 190 for a support of the power converter device 50 and/or of a functional device. The two fixation elements 190 are respectively arranged between the two further alleyways 92 and/or between the two cable channel elements 182, and extend, in particular at least substantially perpendicularly to the ideal water surface 82 and/or to the main extension plane of the floating carrier device 106, from the carrier elements 186 of the carrier structure 176 which support the bottom elements 178 and/or the cable channel elements 182, from below the further alleyways 92 and/or the cable channel elements 182, up to above the further alleyways 92 and/or the cable channel elements 182. In particular, the fixation elements 190 are embodied as hollow profiles. The fixation elements 190 delimit a plurality of openings for a modular fixation of the power converter device 50 and/or of the functional device. However, other implementations of the carrier structure 176, in particular of the fixation elements 190, are also conceivable.

REFERENCE NUMERALS 6 energy conversion system
8 floating carrier device
9 floating carrier device
10 solar element
12 floating body
14 carrier structure
16 side wall
18 side wall
20 receiving region
22 further receiving region
24 upper side
26 stack element
28 stack element
30 crimp profile
32 underside
34 closure element
36 carrier element
38 opening
40 slant surface
42 longitudinal carrier element
44 transverse carrier element
46 air circulation opening
48 floating unit
50 power converter device
52 energy conversion unit
54 reference rectangular cuboid
56 envelope
58 reference upper side
60 reference underside
62 reference side face
64 reference side face
66 connection device
68 raft unit
70 damper unit
72 mobile connection unit
74 connection element
76 connection element
78 rigid connection unit
80 wave-breaker device
82 water surface
84 anchoring unit
86 longitudinal extension
88 alleyway
90 transverse extension
92 alleyway
94 transverse extension
96 bottom element
98 solar device
100 floating carrier device
102 floating body
104 carrier structure
106 floating carrier device
108 bracing element
110 longitudinal extension
112 transverse extension
114 longitudinal extension
115 longitudinal extension
116 stabilization device
118 floating unit
120 distance
122 energy conversion system
124 stabilization element
126 bracing unit
128 bracing element
130 stabilization element
132 force transfer area
134 transverse force transfer area
136 bracing element
138 distance
140 distance
142 longitudinal extension
144 longitudinal extension
146 main extension axis 148 transverse extension
150 hollow space
152 outer surface
154 wall thickness
156 projection
158 receiving region
160 distance
162 longitudinal extension
164 main extension axis
166 longitudinal extension
168 row
170 longitudinal extension
172 transverse extension
174 longitudinal extension
176 carrier structure
178 bottom element
180 longitudinal extension
182 cable guiding element
184 upper side
186 carrier element
188 upper side
190 fixation element

The invention claimed is:

1. A solar park, which is configured to be arranged floating on a body of water, with at least three floating units and with at least one connection device, wherein the connection device connects at least two floating units in a rigid manner and/or at least two floating units in a movable manner, wherein at least one of the floating units comprises four floating bodies, wherein the at least one floating unit comprises at least one carrier structure that is configured to transfer a support force of at least one power converter device to floating bodies of the floating units, wherein the carrier structure comprises a connection region for an accommodation of the connection device, wherein the four floating bodies have a rectangular layout, wherein the carrier structure further comprises at least two carrier elements that are embodied as longitudinal carrier elements and at least one carrier element that is embodied as a transverse carrier element, for a form-fit accommodation of the floating bodies.

2. The solar park according to claim 1, wherein the floating unit (48a) comprises at least one carrier structure which is configured to transfer a support force of at least one energy conversion unit to the at least one floating body.

3. The solar park according to claim 1, wherein the floating body comprises a receiving region for the carrier structure on at least one side wall and/or on an upper side.

4. The solar park according to claim 1, comprising a raft unit comprising at least two, in particular at least three, floating units, wherein in an assembled operation state the connection device rigidly connects at least two of the floating units of the raft unit to each other, and in particular rigidly connects at least a large portion of the floating units to each other.

5. The solar park according to claim 4, wherein the raft unit is embodied as an M×N array, with M*N floating units which are, at least to a large extent, rigidly connected, M and N each being an element from the set of positive integers.

6. The solar park according to claim 4, comprising at least two raft units which are, at least to a large extent, connected to one another in a movable manner by means of the connection device.

7. The solar park according to claim 1, wherein the floating unit comprises at least one carrier structure which is configured to transfer a support force of at least one power converter device to the at least one floating body, wherein the at least one carrier structure is configured to transfer a support force of at least one energy conversion unit to the at least one floating body, wherein the floating body comprises a receiving region for the carrier structure on at least one side wall and/or on an upper side, wherein the connection device at least partially has a connection with the carrier structure.

8. The solar park according to claim 1, wherein in a pre-assembled state, the connection device comprises at least one connection unit that is implemented to be foldable.

9. The solar park according to claim 1, wherein the connection device comprises at least one damper unit.

10. The solar park according to claim 1, wherein the connection device comprises a mobile connection unit comprising at least two connection elements, which are pivotably connected to each other.

11. The solar park according to claim 1, wherein the connection device comprises at least one hollow profile.

12. The solar park according to claim 1, wherein the connection device is implemented at least partially of steel.

13. The solar park according to claim 1, wherein the connection device comprises a rigid connection unit.

14. The solar park according to claim 1, comprising at least one stabilization device, which is arranged on at least one floating unit of the floating units below a water surface of the water body and which is configured to apply at least the floating unit with a counterforce to a movement of the floating unit relative to the water surface, wherein in at least one operation state the stabilization device has a greater maximum distance from the water surface than the floating unit, in particular than a floating body of the floating unit.

15. The solar park according to claim 14, wherein in at least one operation state the stabilization device has in a perpendicular direction a maximum distance from the floating unit of at least 50 cm.

16. The solar park according to claim 14, wherein the stabilization device comprises at least one force transfer area for a cooperation with a fluid of the water body, said force transfer area being arranged, at least substantially parallel to an ideal water surface, and the force transfer area amounting to at least 2,500 cm$^2$.

17. A solar park, which is configured to be arranged floating on a body of water, with at least three floating units and with at least one connection device, wherein the connection device connects at least two floating units in a rigid manner and/or at least two floating units in a movable manner, comprising at least one stabilization device, which is arranged on at least one floating unit of the floating units below a water surface of the water body and which is configured to apply at least the floating unit with a counterforce to a movement of the floating unit relative to the water surface, wherein in at least one operation state the stabilization device has a greater maximum distance from the water surface than the floating unit, in particular than a floating body of the floating unit.

18. The solar park according to claim 15, wherein in at least one operation state the stabilization device has in a perpendicular direction a maximum distance from the floating unit of at least 50 cm.

19. The solar park according to claim 14, wherein the stabilization device comprises at least one force transfer area for a cooperation with a fluid of the water body, the force transfer area being arranged at least substantially parallel to an ideal water surface, and the force transfer area amounting to at least 2,500 cm$^2$.

* * * * *